(12) United States Patent
Küchel

(10) Patent No.: US 6,879,402 B2
(45) Date of Patent: Apr. 12, 2005

(54) SCANNING INTERFEROMETER FOR ASPHERIC SURFACES AND WAVEFRONTS

(75) Inventor: Michael Küchel, Oberkochen (DE)

(73) Assignee: Zygo Corporation, Middlefield, CT (US)

( * ) Notice: Subject to any disclaimer, the term of this patent is extended or adjusted under 35 U.S.C. 154(b) by 123 days.

(21) Appl. No.: 10/295,479

(22) Filed: Nov. 15, 2002

(65) Prior Publication Data

US 2003/0103215 A1 Jun. 5, 2003

Related U.S. Application Data

(60) Provisional application No. 60/338,689, filed on Nov. 16, 2001.

(51) Int. Cl.[7] .................................................. G01B 9/02
(52) U.S. Cl. ...................................................... 356/513
(58) Field of Search ................................ 356/457, 458, 356/489, 495, 511, 512, 513, 515

(56) References Cited

U.S. PATENT DOCUMENTS

| | | | |
|---|---|---|---|
| 4,697,927 A | | 10/1987 | Ono |
| 5,004,346 A | | 4/1991 | Kuhel |
| 5,187,539 A | * | 2/1993 | Adachi et al. ............... 356/124 |
| 5,416,586 A | | 5/1995 | Tronolone et al. |
| 5,625,454 A | | 4/1997 | Huang et al. |
| 5,844,670 A | | 12/1998 | Morita et al. |
| 5,933,236 A | | 8/1999 | Sommargren |
| 6,222,621 B1 | | 4/2001 | Taguchi |
| 6,312,373 B1 | | 11/2001 | Ichihara |
| 6,456,382 B2 | | 9/2002 | Ichihara et al. |
| 6,707,616 B1 | | 3/2004 | Takahashi et al. |
| 6,714,308 B2 | * | 3/2004 | Evans et al. ................. 356/513 |
| 2003/0002049 A1 | * | 1/2003 | Kuchel ......................... 356/513 |
| 2003/0103215 A1 | * | 6/2003 | Kuchel ......................... 356/513 |

OTHER PUBLICATIONS

International Search Report mailed on Apr. 10, 2003 in PCT/US02/36733.

(Continued)

Primary Examiner—Samuel A. Turner
Assistant Examiner—Michael A. Lyons
(74) Attorney, Agent, or Firm—Francis J. Caufield

(57) ABSTRACT

Interferometric scanning method(s) and apparatus for measuring rotationally and non-rotationally symmetric test optics either having aspherical surfaces or that produce aspherical wavefronts. A spherical or partial spherical wavefront is generated from a known origin along an optical axis. The test optic is aligned with respect the optical axis and selectively moved along it relative to the known origin so that the spherical wavefront intersects the test optic at the apex of the aspherical surface and at radial positions where the spherical wavefront and the aspheric surface intersect at points of common tangency. An axial distance, v, and optical path length, p, are interferometrically measured as the test optic is axially scanned by the spherical wavefront where v is the distance by which the test optic is moved with respect to the origin and p is the optical path length difference between the apex of an aspherical surface associated with the test optic and the apex of the circles of curvature that intersect the aspherical surface at the common points of tangency. Coordinates of the aspherical surface are calculated wherever the circles of curvature have intersected the aspherical surface and in correspondence with the interferometrically measured distances, v and p. Afterwards, the shape of the aspheric surface is calculated. Where the test optic comprises a refracting optic a known spherical reflecting surface is provided upstream of the refracting optic for movement along the optical axis and a known wavefront is made to transit the refracting optic, reflects from the known spherical surface, again transits the refracting optic traveling towards the known origin after which the interferogram is formed. In another aspect of the invention, a spherical reference surface is provided to form a Fizeau that is used to generate phase information for measuring spheres, mild aspheres, and multiple mild aspheres.

26 Claims, 16 Drawing Sheets

OTHER PUBLICATIONS

Lin, Ding–tin, and Wang, Der–Shen. "Profile Measurement Of An Asperic Cylindrical Surface From Retroreflection." Applied Optics, vol. 30, No. 22 (Aug. 1, 1991): pp. 3200–3204.

Dörband, B. et al. "High Precision Interferometric Measurements of Lens Elements." Fringe 97: Proceedings of the 3rd International Workshop on Automatic Processing of Fringe Patterns Held in Bremen, Germany, Sep. 15–17, 1997. pp. 473–480.

International Search Report from PCT/EP02/07378 mailed on Nov. 15, 2003.

V. Greco, et al., "Interferometeric testing of weak aspheric surfaces versus design specifications", Optik, 87, No. 4 (1991), pp 159–162.

* cited by examiner

SCANNING INTERFEROMETER FOR ASPHERIC SURFACES AND WAVEFRONTS

CROSS REFERENCE TO RELATED APPLICATION

This application claims priority from U.S. Provisional Patent Application No. 60/338,689 filed on Nov. 16, 2001 in the name of Michael Küchel for "SCANNING INTERFEROMETER FOR ASPHERIC SURFACES AND WAVEFRONTS, the entire contents of which is incorporated herein by reference.

FIELD OF THE INVENTION

In general, this invention relates to the field of interferometry and, in particular, to the high accuracy measurement of aspherical surfaces and wavefronts in an absolute manner.

BACKGROUND OF THE INVENTION

Aspherical surfaces have become more and more important in modern optical systems because they offer a higher number of parameters for simplifying systems while optimizing their performance. This can lead to systems with less surfaces, less weight, smaller dimensions and higher states of correction, to mention only a view advantages. This is especially true in fields where a high number of optical surfaces are not practical, like in astronomical telescopes or normal incidence reflecting surfaces for the EUV wavelength of 13.6 nm used for lithography tools where it is mandatory to keep the number of surfaces as low as possible. In such cases, there is no choice but to use aspherical surfaces. With demands for high quality performance for complete systems operating in the EUV-regime, the surface errors of reflecting surfaces within such a system must be kept below 0.1 nm, and the measuring accuracy and precision for such errors must be even higher to be able to produce the surfaces in a deterministic manner. In addition, lens surfaces in multi-element lithography lenses operating at wavelengths of 193 nm and 157 nm are made aspherical to lower the number of elements made, which are of rare and expensive materials. In these cases, the departures from a best fitting sphere can be as large as 1000 μm, and the dimensions of such lens surfaces have increased to nearly 500 mm.

In an optical system, the function of any its lens elements is to modify the wavefront transmitted by the individual lens elements according to the optical design of the whole system. If a spherical wave or a plane wave enter such a lens, an aspherical wavefront with a very high departure from the best fitting sphere is produced, depending on the conjugates used in the particular test-configuration. So even the fundamental single lens element with either spherical or aspherical surfaces can only be tested properly if one is able to deal with aspherical wavefronts in a test set-up. Moreover, this ability is very important to testing wavefronts transmitted through lens elements because inhomogeneity of the lens material itself can deteriorate the wavefront even when the surfaces are otherwise free of error.

The measurement of aspherical surfaces and wavefronts has been very difficult because of the large departure from the best fitting sphere. With interferometric measurements, high precision is by making the dynamic range of the measurement very small, and for this purpose, the wavefront of the reference wavefront, against which the aspherical wavefront is compared, has to be made aspherically as well to ideally fit the wavefront to be measured completely. In prior art, this has been done either by refractive systems, so called "null-lenses", or with diffractive elements, so called "computer generated holograms", which alter a wave of known and measurable shape (spherical or preferably plane wave) as it transits the compensation element to fit the design aspherical surface at the location where it is placed in the test-set up by design.

In all these cases, the compensation element must be tested to be sure that the correct wavefront is delivered for comparison. But, it is obvious that the same difficulties exist for this type of testing because, again, an aspherical wavefront is produced. Therefore, only indirect test methods are applied by, for instance, measuring the surface of each lens element used in a null system, which is exclusively built with the help of spherical surfaces. Also, the refractive index of the lens material, the lens thickness and the air-spacing of the lenses are measured carefully. Nevertheless, the final accuracy is questionable because of accumulation of measurement errors and the uncertainty of the homogeneity within the lens material.

There are many methods and apparatus in the prior art for measuring aspherical optical surfaces, for example: 1. Contacting and non-contacting stylus based profilers; 2. Contacting and non-contacting stylus based coordinate measuring machines; 3. Spherical wavefront interferometers; 4. Lateral and radial shearing interferometers; 5. Interferometers with null lenses in the measurement path; 6. Scanning spherical wave interferometers; 7. Scanning white light interferometers; 8. Sub-aperture stitching interferometers; 9. Interferometers using computer generated holograms-CGHs; 10. Point diffraction interferometers-PDIs; 11. Longer wavelength interferometry; and 12. Two wavelength interferometry. While these techniques have utility for many applications, they are limited in their operational capabilities or precision compared with those needed for today's evolving lithography applications.

Contacting and non-contacting stylus based profilers mechanically scan the aspherical surface under test and, therefore, are slow because they measure only a few data points at a time. Slow techniques are very susceptible to measurement errors due to temperature variations during the measurement. The same limitations apply to contacting and non-contacting stylus based coordinate measuring machines.

Spherical wavefront interferometers usually require the spacing between the element generating the spherical wavefront and the aspherical surface under test to be scanned thereby increasing the measurement time for the entire surface under test thus introducing another parameter which must be measured, usually by another measurement device, and means, commonly known as stitching, for connecting the data from the various zones which fit as the spacing is scanned.

Scanning white light interferometers have many of the same limitations as spherical wavefront interferometers. Lateral and radial shearing interferometers usually measure the slope of the surface under test and thereby introduce measurement errors during the reconstruction of the surface under test via integration of the slopes. This latter type of limitation applies to differential types of profiling techniques as well.

Sub-aperture stitching interferometers introduce serious measurement errors in the stitching process. Interferometers using computer generated holograms are susceptible to errors introduced by the CGH and stray Moiré patterns. It is also difficult to calibrate, i.e., know the calibration of the CGH. Point diffraction interferometers are a class of spherical wavefront interferometers, and therefore, have many of the same limitations, as well as poor lateral spatial resolution.

None of the prior art approaches is entirely satisfactory since each involves a trade-off that places long lead times on the design of the measurement apparatus and method, requires additional fabrication, increases the difficulty of using and calibrating the measurement apparatus, decreases the accuracy and precision, and greatly increases the cost and delivery time of the aspherical optical element.

As a result of certain deficiencies in prior approaches to measuring aspheres, it is a principle object of the present invention to provide a method(s) and apparatus for high accuracy absolute measurement of aspherical surfaces or aspherical wavefronts, either the surface of the final optical part or the wavefront of the final optical lens element in transmission, or by absolutely qualifying the compensation elements for the measurement of aspheres, being either of the refractive, diffractive of reflective type, therefore enabling other, more productive methods for the measurement of the components to be produced in volume.

It is another object of the present invention to provide method(s) and apparatus for measuring aspherical surfaces and wavefronts with large aspherical departures and surface slopes.

It is yet another object of this invention to provide method(s) and apparatus for measuring spherical surfaces and aspherical surfaces and wavefronts with small departures from spherical surfaces.

It is another object of the present invention to provide method(s) and apparatus for measuring aspherical surfaces and wavefronts with large diameters and clear aperture.

It is yet another object of the present invention to provide method(s) and apparatus which can be adapted to different measurement purposes and aspherical surfaces and wavefronts in an easy manner.

It is still another object of the present invention to provide method(s) and apparatus for measuring aspherical surfaces and wavefronts which can be calibrated absolutely.

It is a further object of the present invention to provide method(s) and apparatus which have highly reduced sensitivity to vibrations when measuring aspherical surfaces and wavefronts.

It is another object of the present invention to provide method(s) and apparatus which have reduced sensitivity to temperature changes in the measurement of aspherical surfaces and wavefronts.

It is yet another object of the present invention to provide method(s) and apparatus which have reduced sensitivity to air turbulence of the gas in the interferometer (measurement) cavity in measuring aspherical surfaces and wavefronts.

It is a further object of the present invention to provide method(s) and apparatus that can work with a light source of only a coherence length equal to the aspherical departure.

It is yet a further object of the present invention to provide method(s) and apparatus which can also work with wavelengths for which only point detectors exist (UV and IR-range).

It is still a further object of the present invention to provide method(s) and apparatus which automatically adjust for the spatial location from where the measurement points are sampled.

It is still another object of the present invention to provide method(s) and apparatus which can be adjusted to the spatial resolution required for the measurement.

It is yet a further object of the present invention to provide method(s) and apparatus which have reasonable speed of measurement.

It is still a further object of the present invention to provide method(s) and apparatus which compute both critical coordinates of the aspherical surface, the radial distance h and the axial distance, z, solely from interferometric measurements and not from the geometrical mapping of the detectors onto the surface.

Other objects of the invention will, in part, be obvious and will, in part, appear hereinafter when the detailed description is read with reference to the drawings.

SUMMARY OF THE INVENTION

In one aspect of the method and apparatus for measuring aspherical surfaces and wavefronts according to the invention, an aspherical surface is illuminated with a wavefront that fits the shape of the surface only in some locations, which are at the center and a radial "zone". In those locations, the surface has the same slope as the illuminating wavefront, i.e., the rays strike the aspherical surface at normal incidence and are reflected back by auto-collimation. It is only in those locations where measurement data points are sampled at the instant of normal incidence.

In one variation of the basic principle, the incidence of the rays is not normal to the surface, but the parts of the surface where the actual measurement points are sampled act again as to image the light source with unit magnification, but in a reversed real image.

According to the invention, the optical path difference between the center and the "zone" is measured by bringing those rays to interfere with each other and measuring the intensity of the interference. The correct and useful rays for that interference are automatically sampled by the use of an aperture, which is located in the image of the light source.

In accordance with the invention, an aspherical test surface is shifted along a scanning axis and as it travels, the same center-part as before is hit by rays, which later enter the aperture, but now the "zone" shifts radially to a new location in correspondence with the axial position of the test surface. In each of the radial "zones" the criterion of normal incidence or, respectively, the imaging criterion of the light-source into the aperture is satisfied. Scanning the aspherical surface axially causes the optical path-difference between the rays from the center and the radially moving zone to change, and the measured intensity of the interference is modulated. With a sliding windowing technique and an appropriate phase-measurement algorithm, the phase-information is extracted from the measured intensity, and from the phase, the optical path difference is calculated. This is done with an algorithm that allows computation of not only the axial position, z, on the aspherical surface, but also the lateral height, h, of each radial "zone", where the rays are sampled. This is achieved by measuring the optical path difference of the two rays: (1) from the light source to the zone and back to the sampling aperture and (2) from the light source to the center and back to the sampling aperture interferometrically, while also measuring the scanning of the aspherical surface with the help of an external distance measuring interferometer (DMI). Consequently, two quantities are measured with interferometric precision with the condition of autocollimation satisfied where the light rays are incident normal to the surface or, equivalently but more generally, that the light source is imaged onto the sampling aperture with magnification =−1.

According to another aspect of the invention, the light-source and a corresponding sampling aperture are rings with diameters large enough to be able to resolve the image of the test surface onto the detectors azimuthally, and with a ring width that is small enough to isolate the coherent light from the small areas on the test surface that are probed.

It is a special feature of the invention that the detectors are not located in a conjugate to the test surface in the radial direction (i.e., an image of the surface) as is the case for the azimuthal direction, but in a conjugate (i.e., an image) of the light source. With this arrangement, the rays from the center and the "zone" are made to interfere because they are not separated on the detector but made to be on top of each other. The imaging optics behind the sampling aperture is an anamorphic one, but in the sense of radial coordinates, not Cartesian as in the usual case. This special anamorphic imaging is derived by a holographic optical element (similar to a Fresnel zone plate). For detectors, PIN diodes, or the like, having similar sensitivity and frequency response are preferred.

According to another aspect of the invention, a test-set up is calibrated absolutely by measuring an aspherical surface of known shape in the same way as an unknown aspherical surface would be probed, i.e., by scanning axially. This known surface could be a parabola, for instance, which can be measured absolutely with the help of a known plane mirror and a known spherical mirror using known procedures available to measure those surfaces in an absolute manner. Another possibility is to use a lens with spherical surfaces used in transmission together with a known autocollimation mirror. The lens can be measured in transmission beforehand in an absolute manner with the use of other conjugates.

According to another aspect of the invention, spherical surfaces, mildly aspheric surfaces, and mildly aspheric surfaces that have more than one departure from a sphere can be measured by using the inventive procedures to locate the zone of contact, unwrap the measured phase values and calculate the phase difference between a zone and the center of the interferogram.

BRIEF DESCRIPTION OF THE DRAWINGS

The structure, operation, and methodology of the invention, together with other objects and advantages thereof, may best be understood by reading the detailed description in conjunction with the drawings in which each part has an assigned numeral that identifies it wherever it appears in the various drawings and wherein.

DETAILED DESCRIPTION

Figure 1:
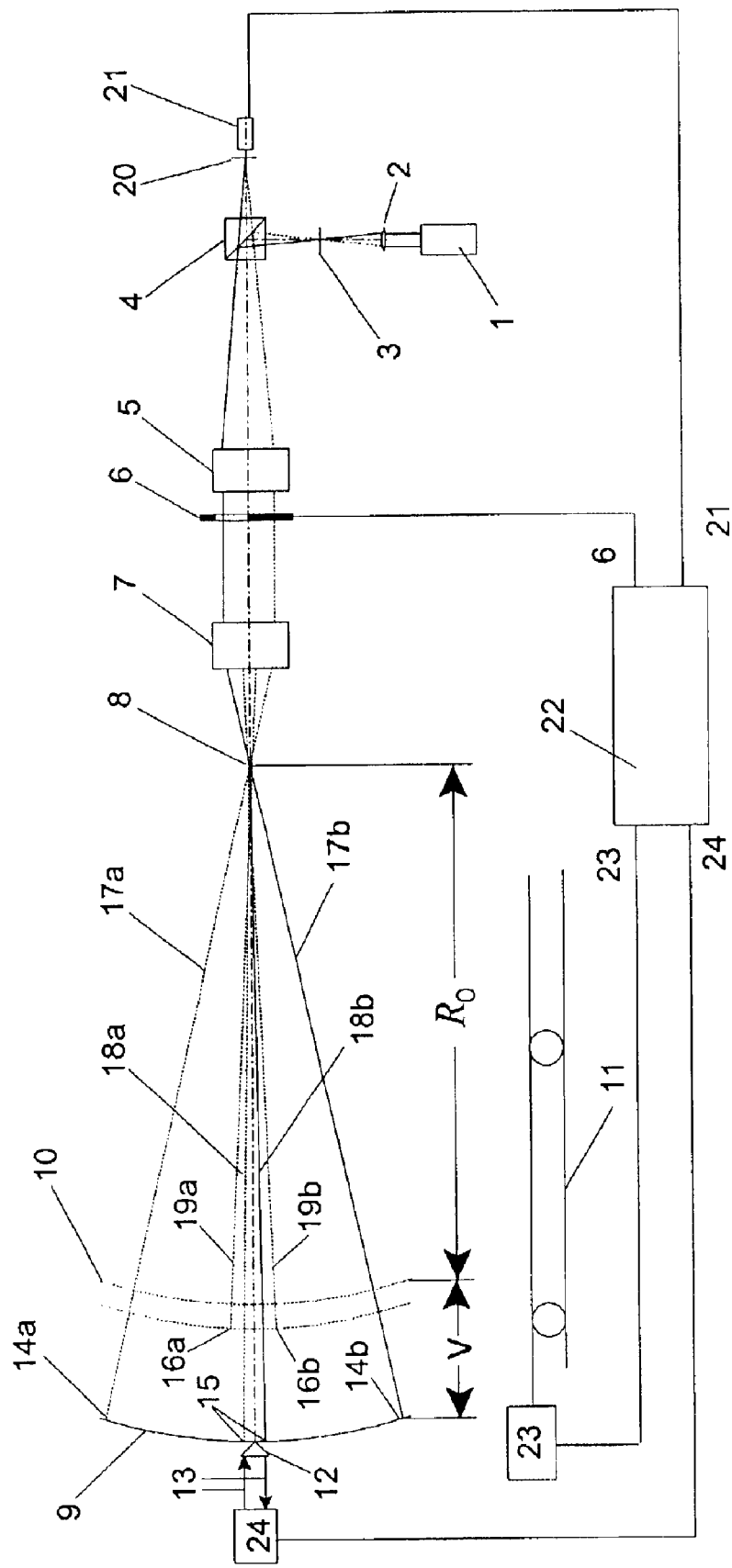
FIG. 1 is a diagrammatic side elevational view of a preferred embodiment of the invention.

The preferred embodiments together with a associated algorithms will now be described in a more detailed manner. Reference now made to FIG. 1 which shows a simple embodiment of the invention. Light from a coherent light source 1 is focused by a lens 2 into an aperture 3 and hits a beamsplitter 4. The aperture 3 is located in the focal plane of a collimator lens 5, so a plane wave emerges from the collimating lens 5. This plane wave strikes a slit aperture 6, which may be worked into a piece of metal or evaporated onto a glass plate. In FIG. 1, slit aperture 6 lets rays above the optical axis pass and blocks the rays below the optical axis; but a certain region around the optical axis is open all the time, e.g. the slit aperture 6 does not end exactly at the optical axis (See slit 6a in FIG. 2).

In FIG. 1, the rays that pass slit 6a enter a de-collimator lens 7, which focuses the light at a focus point 8 which is an image of aperture 3. Lenses 5 and 7 are highly corrected to have only negligible spherical aberration so that a nearly ideal spherical wavefront emanates from focal point 8 with slit aperture 6 removed. However, with slit aperture 6 in place, only part of the converging spherical wavefront is directed towards aspherical test surface 9.

The axial position of aspherical test surface 9 can be selectively changed by moving it along the optical axis to be scanned by the wavefront emitted from focus point 8. This is done with the aid of a high-precision mechanical lead 11. The position of the aspherical surface 9 can be measured by one or more distance measuring interferometer(s) (DMI) 24 with the help of a corner cube 12 which is mounted onto the back side of the mount of the aspherical surface 9 and probed by the rays 13 serving as in and outgoing measurement beams. It is even more advantageous to use more than one axis for this measurement. For example, use of three corner cubes, with equal distance from the optical axis and circumferentially spaced apart by 120° from each other, can be made to measure not only the shift, but also the tip and tilt of the surface under test and to automatically correct for that in a closed loop arrangement. Similarly, two plane mirrors with their surfaces parallel to the scan-direction (i.e. the optical axis) might be mounted together with the surface under test and probed by another two axis of a DMI to monitor and compensate for lateral shifts which might occur during the movement of the aspheric surface. It is preferred to use sitemaps that account for five degrees of freedom where rotationally symmetric optics are being measured and six degrees of freedom where non-rotationally symmetric optics are measured so that sufficient control of the movement can be made with high precision.

In the extreme left axial position of the aspherical surface 9 shown in FIG. 1, the ray on the axis together with the ray 14b (the ray 14a is actually blocked by the slit 6a) might initially hit the surface at or near normal incidence and the rays in the very vicinity of the axis. In a certain circle 15, but also in the vicinity of the ray 14b, this condition of normal incidence is violated, but only very slightly. For all the other rays the condition of a perpendicular hit (non-normal incidence) of the surface is violated stronger, so that the out bouncing rays do not coincide with the in bouncing rays. After passing the slit aperture 6 a second time and after de-collimation by lens 5, the rays pass the beamsplitting device 4 and reach a very small aperture (pinhole) 20. Only the rays from the center and the rays from the zone where the rays were exactly normal to the surface can pass the pinhole 20. Directly behind the pinhole is a photodetector 21 sensitive at the used wavelength (preferably a pin-photodiode or a photomultiplier), which senses the interference of the rays from the center and the zone. Thus, all other classes non-normal rays are spatially filtered from further travel to photodetector 21. It should also be noted that the distance between the pinhole 20 and the photodetector 21 is very small and that the pinhole 20 diffracts the light into a cone. Therefore, the wavefronts can overlap and interfere, despite different incidence directions before the pinhole.

When the surface 9 is not shifted axially and when the slit 6a remains in a constant azimuthal position, the measured intensity might be ideally constant. In the case where there is some air movement within the region where the rays are separated considerably some fluctuations in the measured intensity might be present in the signal due to differences in the refractive index of the moving air and, accordingly, changes in the optical path difference. Mechanical vibrations of the set up do not result in severe intensity modulations as is usually the case in interferometry because, to a first order, the optical path difference is desensitized in that regard.

When the surface 9 is not scanned axially but the slit aperture 6 is rotated with a frequency $f_{slit}$, the measured intensity of the interference of the rays from the zone and the rays from the center might be modulated if the rotational symmetric aspherical surface is not adjusted correctly, e.g., if the optical axis of the surface 9 does not coincide with the optical axis of the test-set up (given by the focal point 8 together with the vertex of the lens 7). To avoid this, adjustments can be performed by minimizing the amplitudes of the intensity variation. If the surface 9 under inspection has some astigmatism, it may not be possible to bring the amplitude of the intensity variation to zero; nevertheless a minimum modulation indicates correct adjustment.

Figure 2:
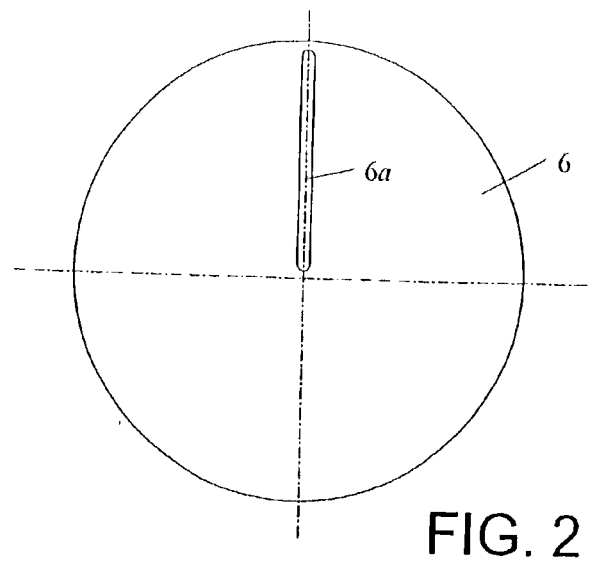
FIG. 2 is a diagrammatic front elevational view of a slit aperture employed in the embodiment of FIG. 1.

The measurement of the surface 9 is performed by scanning the surface under test 9 and at the same time rotating the slit 6. If the scan is started in a position where the focus point 8 coincides with the center of curvature for the apex of the surface, i.e. in the position 10 in FIG. 2, then the surface is probed with two beams, one staying stationary at the center part, the other describing a spiral stating in the center and going all the way out until the very edge of the surface. The number of revolutions at this spiral is given by the number of rotations during the complete scan. This can be adjusted by appropriate setting by the computer, controlling the scan as well as the rotation of the slit-aperture. In FIG. 2, another intermediate position of the aspherical surface, close to the starting position 10, is shown. Here the rays 19a and 19b will later reach the detector and interfere there with the rays from the center. The zone which is probed by these rays is located at 16a and 16b of the surface.

Lead device 11 is driven by a motor 23 to effect axial scanning and is controlled by information from the distance measuring interferometer 24 which is fed to a computer 22 for this purpose. The computer 22 also controls the rotation of the slit aperture 6 and gathers the intensity measurements from the interference measured at detector 21. In addition, computer 22 is provided with suitable instructions in the form of software for implementing algorithms, performs general housekeeping, and serves as an operator interface. It should be pointed out that, as the distance between focus point 8 and surface 9 changes with slit aperture 6 rotating, surface 9 is scanned in spiral fashion with the spiral sweeping out any number of revolutions in response to programmed instructions. A special case occurs when the whole axial scanning is performed without any rotation of the slit aperture 6 and the geometry of this situation should be clear from FIG. 2. In that case, a semi-diameter is probed on the surface 9. After that, the slit 6a is rotated, and the same scanning is repeated again.

The evaluation of the aspherical profile of the surface 9 for this special case will be described now with the help of FIG. 3. As shown in FIG. 1, the axial scanning starts at the position 10 of the surface and ends after an axial shift of v in the position 9. In the starting position 10, the surface has a distance of $R_0$ from the focal point 8 and in the end-position 9, the distance of the apex of the surface from the focal point 8 is $R_0+v$.

Figure 3:
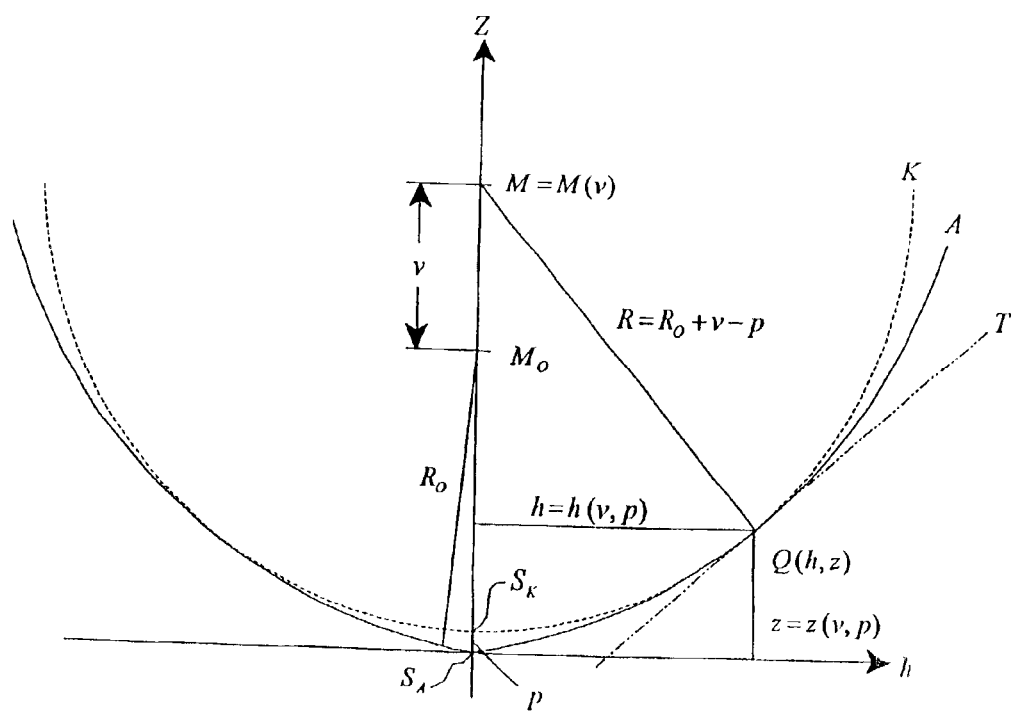
FIG. 3 is a drawing illustrating various parameters and their relationships used in the mathematical evaluation of the aspherical shape of a surface under test using the invention.

In FIG. 3, a cut through the rotationally symmetric aspherical surface 9 is given, establishing an aspherical curve with even symmetry with respect to the z-axis. The following quantities are given:

K is the best fitting circle with its center on the symmetry—axis z to the rotationally symmetric aspherical curve A. This circle touches the aspherical curve A in the point Q(h,z). The normal to the tangent in Q(h,z) (common to K and to A) cuts the z-axis in the point $M(0,R_0+v)$. The distance from Q(h,z) to M(0,R₀+v) is given by the radius R=R₀+v−p of the circle. The circle cuts the z-axis in point $S_K$ (0,p), which is called the apex of the circle. The apex of the aspherical curve is $S_A$ (0,0), i.e., the distance of the apex of the sphere to the apex of the asphere is p.

When the center point M(0,R₀+v) of the circle is shifted the distance v along the z-axis, the point Q(h,z) travels along the aspherical curve; when Q(h,z) coincides with the apex of the aspherical curve $S_A$ (0,0), by definition the shift is v=0. Therefore, the radius of the best fitting circle of the apex of the aspherical curve is R₀.

For the following, it is assumed that R₀ is known and that the center of the circle is shifted the distance v=0. . $v_{max}$. Under these conditions, that shift and together with the small quantity p is measured. Now it will be shown that it is possible to compute the coordinates h and z of the point Q(h,z), which defines the aspherical curve for that semidiameter defined by the azimuthal position of the slit 6a from the knowledge of the functions p=p(v) and $$p'(v) = \frac{d}{dv}p(v).$$

In other words, the aspherical curve is defined in parameter form with the independent parameter v and the two dependent parameters p(v) and p'(v):

$$h=h(v, p, p'); z=z(v, p, p')$$

The equation for the circle can be written as (See FIG. 3):

$$h^2+(R_0+v-z)^2-(R_0+v-p)^2=0 \quad (1)$$

When the center point is shifted an infinitesimal distance dv, the radius of the circle grows by another infinitesimal quantity dp and the new circle cuts the old circle in the common point Q(h,z). The equation for the new circle is:

$$h^2+(R_0+v+dv-z)^2-(R_0+v+dv-p-dp)^2=0 \quad (2)$$

To compute the coordinates z and h, Equations (1) and (2) are solved for the quantities z and h to obtain:

$$z = p + (R_0 + v - p)\frac{dp}{dv} + \left(1 - \frac{1}{2}\frac{dp}{dv}\right)dp$$

The last term can be neglected because it goes to zero for dp→0. So, finally z becomes:

$$z = p + (R_0 + v - p)\frac{dp}{dv} \quad (3)$$

For h we get:

$$h = (R_0 + v - p)\sqrt{\frac{dp}{dv}\left(2 - \frac{dp}{dv}\right)} \quad (4)$$

It is an important feature of the invention that the axial coordinate z as well as the lateral coordinate h can be computed from the two quantities v and p, which are both measured by interferometry with very high precision. It is not necessary for the detector to resolve the radial coordinate h, where the circle and the aspherical curve coincide at the point of tangency.

Having described how to calculate the local slope and its position on the aspheric surface through the simple expediency of interferometrically measuring the axial separation between the focus point 8 and the apex of the aspheric surface and the apical distance between the aspheric surface and the radius of the circle of best fit, i.e., p, the topic of how phase measurement can be effected will now be discussed. FIG. 2 shows the slit aperture 6 in one azimuthal position, and the surface 9 can be scanned axially while aperture 6a remains in this position. Here, the intensity is modulated at detector 21 due to the interference of the beams with the optical path difference between the two interfering beams being given by the quantity, p, i.e., the measured intensity will be:

$$I(v) = A(v) + B(v)\cos\left(2\pi 2\frac{p(v)}{\lambda}\right) \quad (5)$$

where A(v) is the mean intensity, B(v) is the modulation and λ is the wavelength used for the measurement. As long as p(v) is a monotonic growing function of the scanning v, then it is possible to capture I(v) with a high sample rate, for example, with 20 readings per period of the cosine function. This can be done in a number of different ways but only one is described here. When the design of the aspherical surface or wavefront is known, the design values of the quantity p(v) can be computed and the positions v, on which intensity values should be captured, can be determined. Thus, the reading of the detector-values are triggered with this quantity, derived from v. In this case, it is possible to arrange for nearly equal spaced intensity values within one period of the cosine function, and the phase-extraction out of the intensity readings can be done, for instance, with a sliding windowing technique similar to the spatial synchronous detection method described by Womack in Optical Engineering, Vol 23 (1984) 391–395 or by applying one of the well-known compensating algorithms used for temporal phase-shifting (there are a great number of algorithms for this purpose!). The assumptions made are, that the mean intensity A(v) and the modulation B(v) are only very slowly varying functions and can be thought of being constant for the number of intensity measurements used within one formula. When a high number of intensity values are captured within one period, it is also possible to normalize for fluctuations in A(v) and B(v) by appropriate formulas.

After evaluation of p(v), the derivative p'(v) is computed as well by fitting a function (for instance a polynomial or a higher order piecewise spline function) to p=p(v) and calculating the derivative. Then equations (3) and (4) are solved to get the aspherical surface contour for the azimuthal direction θ at which slit 6a was set.

Now slit 6a is rotated by about 179°, and the procedure is repeated for that new azimuthal direction. It should be noted that the scanning can be performed in both directions. After 360 different azimuthal directions, e.g., after 360 scans, the whole surface 9 has been probed with reasonably high density.

Figure 4:
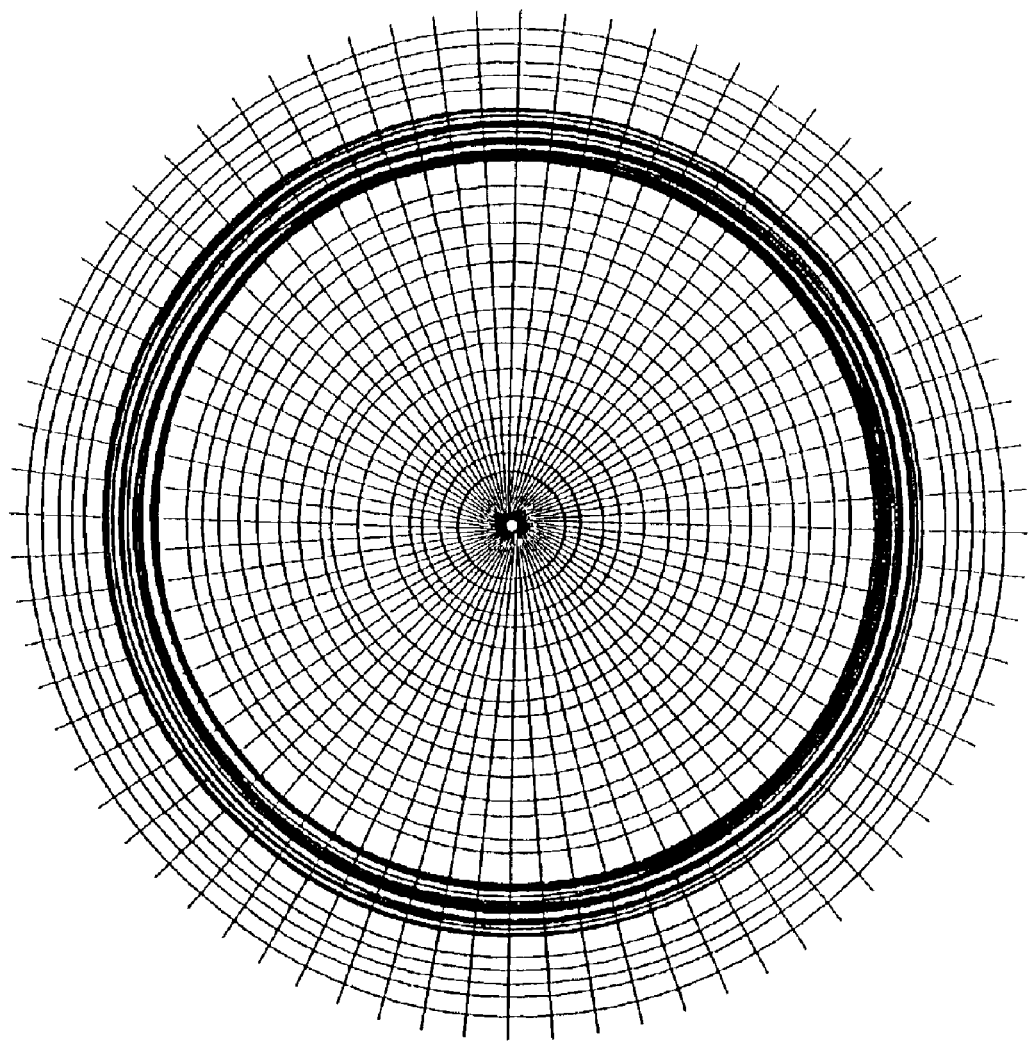
FIG. 4 is a diagrammatic illustration showing traces of the detector ring on the test surface.
Figure 5:
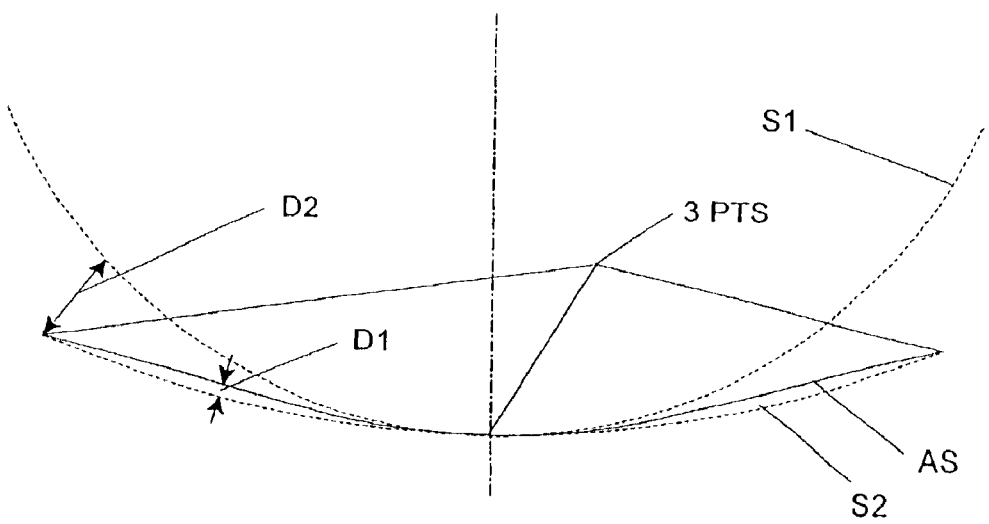
FIG. 5 is a diagrammatic illustration showing a test aspherical curve with a spherical wavefront cutting it in 3 points and the sphere fitting the center of curvature at the apex of the asphere.

Assuming an aspherical deviation of 0.5 mm from the sphere which cuts in 3 points, the aspherical deviation from the sphere which fits the aspherical curve in the apex might be 3 mm, for instance as shown in FIG. 5. Further assuming that use is made of laser light with a wavelength of 0.4 µm with 20 intensity readings per period of the cosine function, then a total of m=20*2*3000 µm/0.4 µm=300000 measurements are needed. This can easily be performed within 3 seconds because 100 kHz does not impose a severe burden for the precise A/D-conversion of the intensity readings with high resolution of 12 bit to 14 bit. For a total of 360 scans then, only 18 minutes are necessary only for capturing the data. With the extra time needed for acceleration and slow down of the movement of the surface 9, it would be reasonable to judge a total measuring time of 30 minutes, which for some purposes could be considered long. FIG. 4 shows traces of the detector ring projected onto the surface 9 and that the resolution azimuthally is dependent on the diameter of the ring and the number of detectors within it. From this it can be appreciated that measurement times can be shortened by using more detectors spaced for higher sampling rates.

To improve measurement speed then, use can be made of multiple detectors instead of the slit aperture 6. To be able to resolve the azimuthal coordinate and at the same time to let the rays from the zone and the rays from the center interfere with each other and automatically select the rays which at any moment are perpendicular to the aspherical surface, pinholes 3 and 20 in FIG. 1 are replaced by a very thin ring-shaped aperture, as described in more detail in U.S. patent application Ser. No. 09/848,055 filed on May 3, 2001 and entitled "APPARATUS AND METHOD(S) FOR REDUCING THE EFFECTS OF COHERENT ARTIFACTS IN AN INTERFEROMETER, the entire contents of which are incorporated herein by reference. This has the benefit, that the azimuthal resolution is preserved, now enabling the use of a multiple detector array in a parallel manner.

Figure 6:
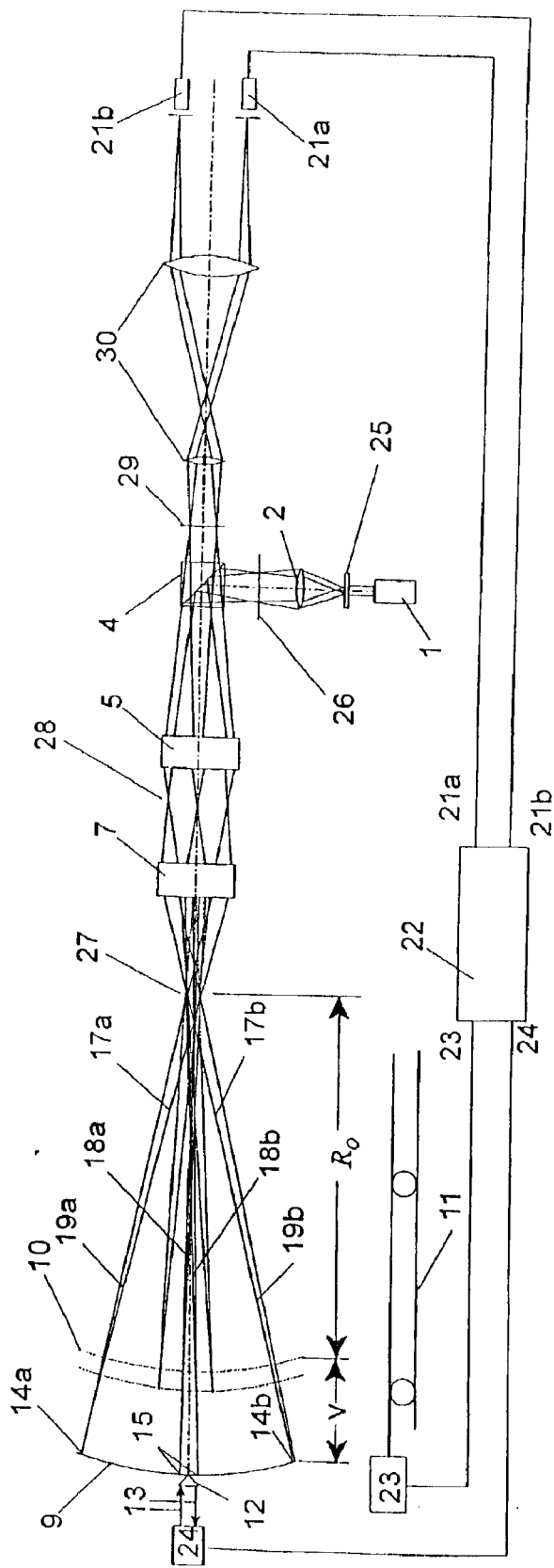
FIG. 6 is a diagrammatic side elevational view of another embodiment for measuring an aspheric surface with a ring-shaped illumination source and a plurality of detectors.
Figure 7:
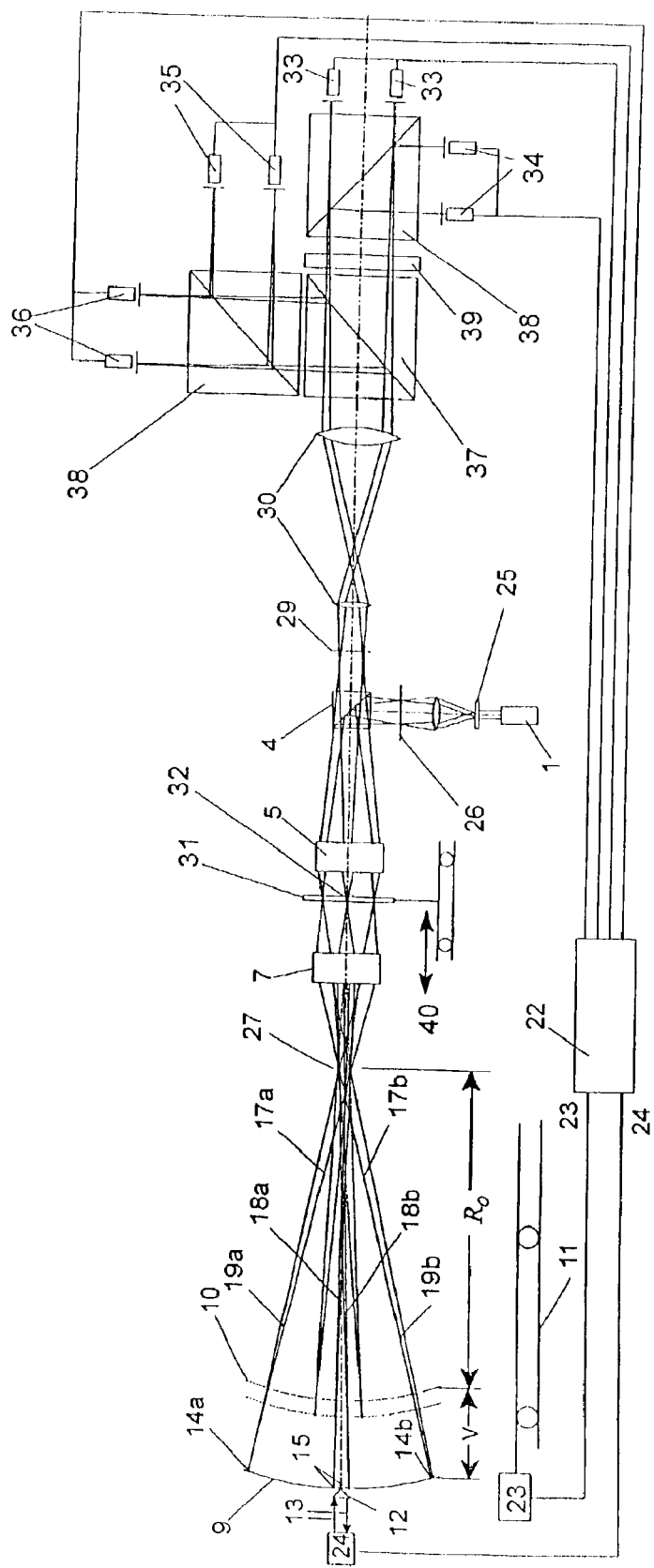
FIG. 7 is a diagrammatic side elevational view of another embodiment of a polarizing version of the invention.

FIG. 7 shows this modified arrangement where common elements have retained their numerical identity from FIG. 1. The beam from the light source 1 is transferred by a holographic optical element 25 and the lens 2 into a ring-shaped form as ring aperture 26. The width of the ring is very small, on the order of 30 $\mu$m to 100 $\mu$m. The ring 26 is imaged by lenses 5 and 7 into a second, demagnified ring-image 27. The aspherical surface 9 under test images this ring into itself, but with an imaging scale of $\beta = -1$, i.e., the image is inverted with respect to the object. It should be noted that only some parts of surface 9 under test are able to perform this imaging; these parts being again the center part and the "zone" where the rays from the center of the circle shaped ring-image 27 are hit by the normals of the surface 9, i.e., the positions 14a and 14b as well as 15 in FIG. 6. These positions are imaged by the lens 7 into the images located at 28 in the intervening space between lenses 5 and 7. The ring at 27 is further imaged by the lenses 7 and 5 into an image located at 29. This is a final conjugate of the ring-aperture 26. In 29, another physical ring-shaped aperture is placed, which acts as a very narrow spatial filter in the radial direction, but has considerable length in the azimuthal direction. In this manner, it is possible to resolve the azimuthal locations on surface 9 under test.

Behind the ring-shaped aperture 29, which has the same physical dimensions as 26, an afocal or telescope system 30 is located, which images the ring 29 onto an arrangement of detectors 21. The detectors 21 (21a and 21b shown) are arranged in a circle in the back focal plane of the second lens of the telescope 30. The magnification of telescope 30 is chosen optimize the higher number of detectors that can be placed in the ring. If the space is still too small, it might be possible to insert a multifaceted pyramid between the lens 30 and the detectors to reflect the light by 90° and thus allow the detectors to all look towards the optical axis thus establishing a larger circle. Also, it would be possible to use a holographic optical element for this purpose, i.e., simultaneously image the surface 9 in azimuthal direction and the sensing aperture 29 in the radial direction onto detectors 21. Such a holographic optical element is for simplicity has not been included in FIG. 6, but is shown in the later FIG. 9 as element 48.

Each of the detectors 21 has its own phase-measuring electronics, so that their corresponding signals can be processed in parallel, but these are not shown explicitly in FIG. 6 as will be understood by those skilled in the art.

If 60 detectors are arranged in a circle, and the same azimuthal resolution as before is assumed, 360 positions at the circumference of the surface 9 under test should be resolved, and the time necessary will be reduced from 30 min to 30 seconds. To be able to resolve 360 different azimuthal locations with only 60 detectors, it is necessary to rotate the circle of detectors in 6 steps of 1° each. Better resolution can be achieved if the steps are chosen smaller. It will be reasonable to choose steps of 10, which lead to a total of 2160 positions at the full circle. Assuming a diameter for the aspherical surface of 300 mm means that the spacing of measured points is about 0.44 mm at the outer circumference. The spatial density for sampling data in the radial direction depends on the slope of the deviation of the aspherical surface from the sphere. As an average value, with about 600,000 points on the diameter, the spacing is 0.5 $\mu$m, i.e., in any case fine enough to locate and detect even very tiny ripples. The much higher sampling density in the radial direction is necessary for precise evaluation of the h, z-coordinates with Equations (3) and (4). Because it is necessary to compute the first derivative of the measured phases, noise will be amplified, and therefore, use of a plurality of measured points in conjunction with a piecewise polynomial fit will improves the precision considerably.

The foregoing methods of detecting the phase values from the intensity measurements, according to Equation (5) have the drawback that variations in the mean intensity A(v), or in the modulation B(v), influence the computed values of p(v). Therefore, it must be assured that such variations will not take place. Due to the high frequency structure that aspherical surfaces might show and due to the "knife-edge like" optical arrangement with a very small ring aperture (like a round slit), this assumption might not be satisfied in all situations. Therefore, it might be necessary to think of alternative ways for phase-extraction from the measurements with the arrangements given with FIGS. 1 and 6.

One approach is to use different polarization stages for the beam at the center of the asphere and the beam at the zone. This can be accomplished by an extra-element inserted in the space between lens 5 and lens 7 in FIG. 6 as shown in FIG. 7 at 31. All other elements in FIG. 7 retain there previous numerical identity. This extra element 31 is a glass plate, where in the center a double refracting element i32 s applied, acting as a quarter-wave plate. This is a very small disc of a double refracting crystal, which is cemented to the very center of the glass plate. Because the lens images the surface under test onto the glass-plate, only a very small part of the center of the aspherical surface acts as a reference for the remaining surface. To keep the glass-plate 31 in focus during the scan, it is necessary to axially shift the glass-plate in a computer controlled manner on a precision slide 40.

When the center part of the beam transverses the quarter-wave plate twice, the linearly-polarized wave has its plane of polarization rotated by 90°. Thus, the two beams are "encoded" by their polarization states, and the relative phase between the beams can be shifted by polarization controlling optical means. There are at least two possibilities which might be applied, which are given in FIGS. 7 and 8.

In FIG. 7, four interferograms are gained with a phase shift of 90° between them. This is a so called quadrature signal. With a non-polarizing beamsplitter 37, both wavefronts with orthogonal linear polarizations are doubled.

Now, a quarter-wave plate 39 in one beam delays the phase of one of the orthogonal polarizations by 90°. After a polarizing beamsplitter 38, the two wavefronts can interfere and produce two intensity patters that are out of phase by 180° to each other. Subtracting the signals sensed with two ring-shaped mounted pin-photodiodes 33 and 34 eliminates the bias A(v) and a DC-free signal proportional to $$B(v)\sin\left(2\pi\frac{2p(v)}{\lambda}\right)$$

results. The signal of two other detector-rings 35 and 36 are subtracted, as well, and now a signal proportional to $$B(v)\cos\left(2\pi\frac{2p(v)}{\lambda}\right)$$

results. From the arctangent of these signals the desired quantity p(v) is derived. This technique is applied frequently with distance measuring interferometers and known to have a precision of about 1.0 nm r.m.s.

Figure 8:
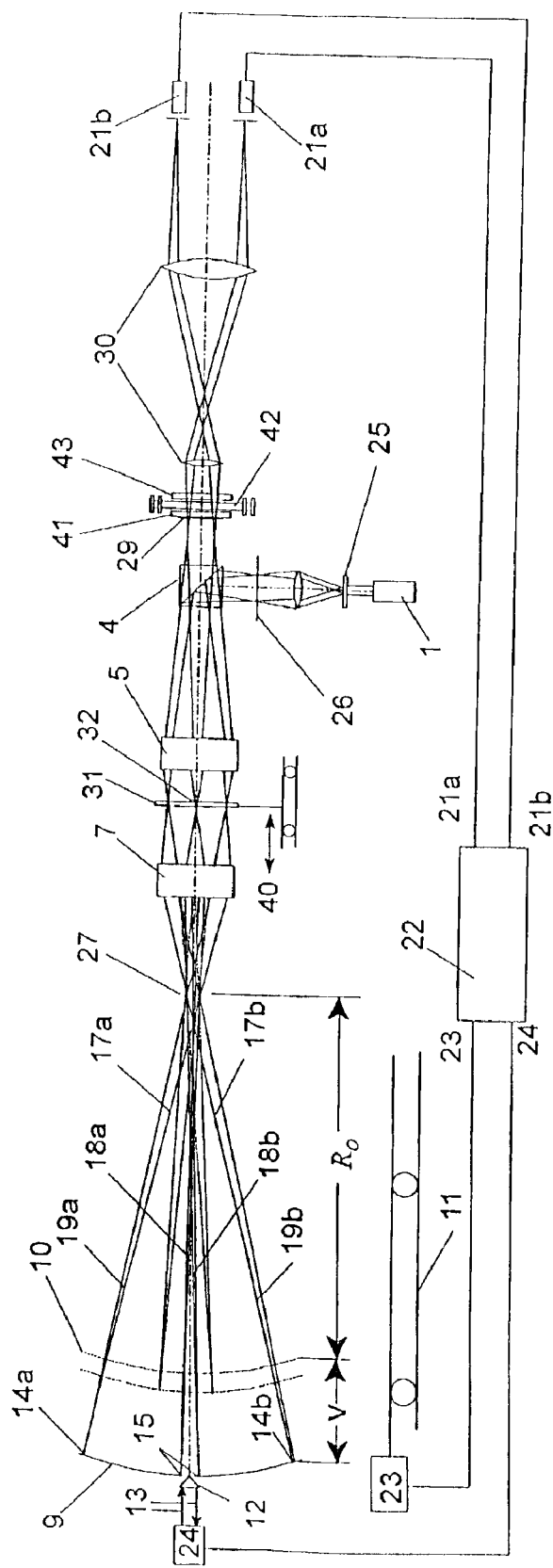
FIG. 8 is a diagrammatic side elevational view of the invention employing polarization encoding and phase-modulation.

In FIG. 8, another possibility is shown, which needs only one detector-ring. Here, the phase-shift must be performed in time, i.e., sequentially rather than parallel. This phase-shift can be accomplished in addition to the phase-shift induced by the scanning procedure and also allows for a measurement in azimuthal direction with the rotation of the part under test without any scanning.

The principle of phase-shifting by polarization is well known: two linearly polarized beams with orthogonal polarization directions transit a properly oriented quarter-wave plate and then transit a rotating half-wave plate. Along with the rotation of this plate, phase modulation takes place. The beams can finally interfere when they are made the same polarization with the help of a polarizer.

Figure 9:
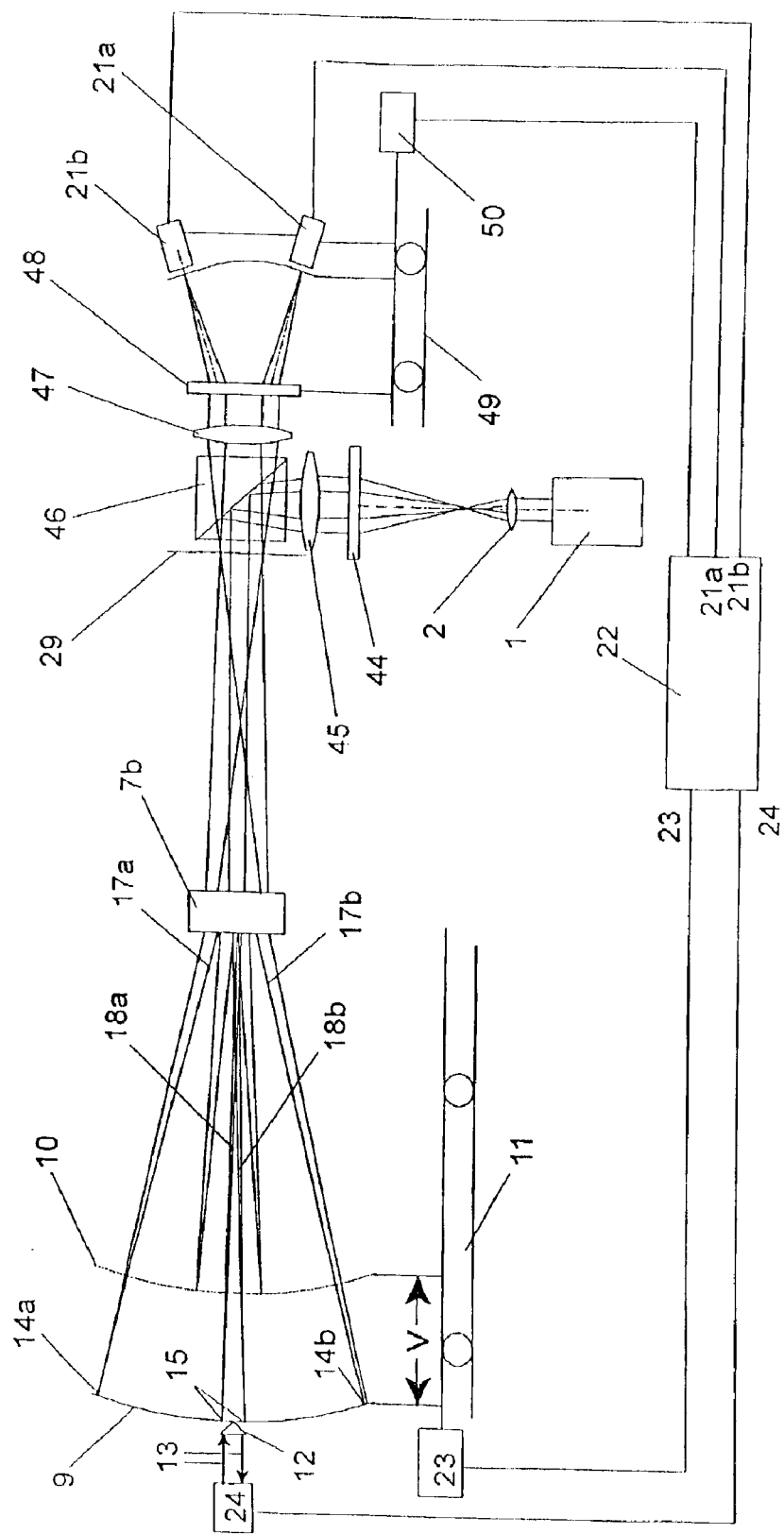
FIG. 9 is a diagrammatic side elevational view of another embodiment of the invention using a diverging lens and corresponding imaging arrangement for testing aspherical surfaces.

FIG. 9 shows a variation of the set-up of FIG. 6. Again, common elements retain their former identity. The ring-aperture 29 is now located between the beam-splitter and a diverging lens 7b. Thus, only one such aperture is necessary, which also simplifies adjustment. The two formerly used collimating lenses 5 and 7 are now replaced by one single diverging lens 7b, which simplifies the set-up further. Because no intermediate focus 27 is used in the apparatus of FIG. 10, the air-path between the surface 9 under test and the diverging lens 7b is shorter. The main difference is in the optical scheme for the imaging surface 9 under test onto the detector-ring in azimuthal direction and of the sensing aperture in the radial direction. Consequently, this imaging is a special kind of anamorphic imaging, which can be performed with the help of a holographic optical element, similar to a Fresnel zone plate. This element is shown as 48 in FIG. 9. It has no power in azimuthal direction. Therefore, the lens 47 together with lens 7b forms a sharp image of the surface 9 onto the detector ring in azimuthal direction, and the ring-shaped aperture 29 acts as the aperture for that image. In the radial direction, the holographic optical element 48 is provided with enough power to image the ring-aperture 29 onto the detector-ring. Here, the focal length of the element 48 is given by the distance of the detector-ring from element 48. Together with this imaging (first diffraction order), a magnification of the diameter is accomplished. The holographic element 48 and the detector ring must be refocused when the surface is scanned. This is done with a computer-controlled precision slide 49 and a motor 50.

Figure 10:
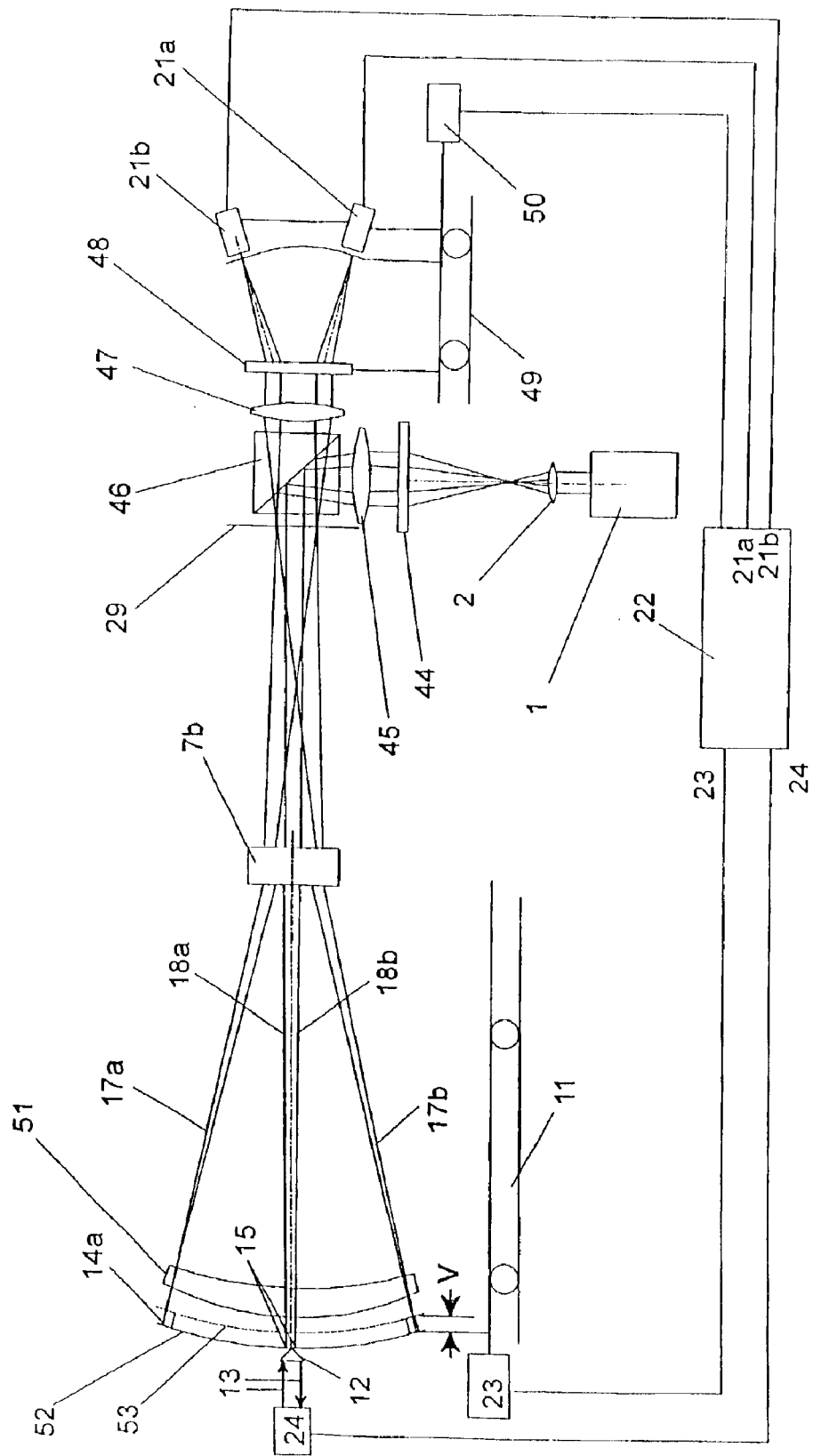
FIG. 10 is a diagrammatic side elevational view of an embodiment of the invention configured to test the aspherical wavefront transmitted from a lens.

In FIG. 10, the testing of an aspherical wavefront is shown, which is delivered by a lens 51. Lens 51 is probed by a spherical wave and a spherical auto-collimation mirror. The auto-collimation mirror is scanned a small distance behind the lens 51, from an initial position 52 to a final position 53. There exist a great variety of different configurations for the conjugates (object-point and image-point of the lens 51), which differ considerably in aspherical departure from the transmitted wave, which the lens adds to the impinging spherical wave. This could be used to minimize the aspherical departure and lead, therefore, to the highest measurement precision because the tolerances for correctly adjusting the test set-up are also lowered in that case. But, it is also possible to test the lens 51 in a configuration similar to the one in which it is used later in an optical system. It can be stated that, in principle, the combination "lens+spherical auto-collimation mirror" acts optically similar to an aspherical mirror.

Figure 11:
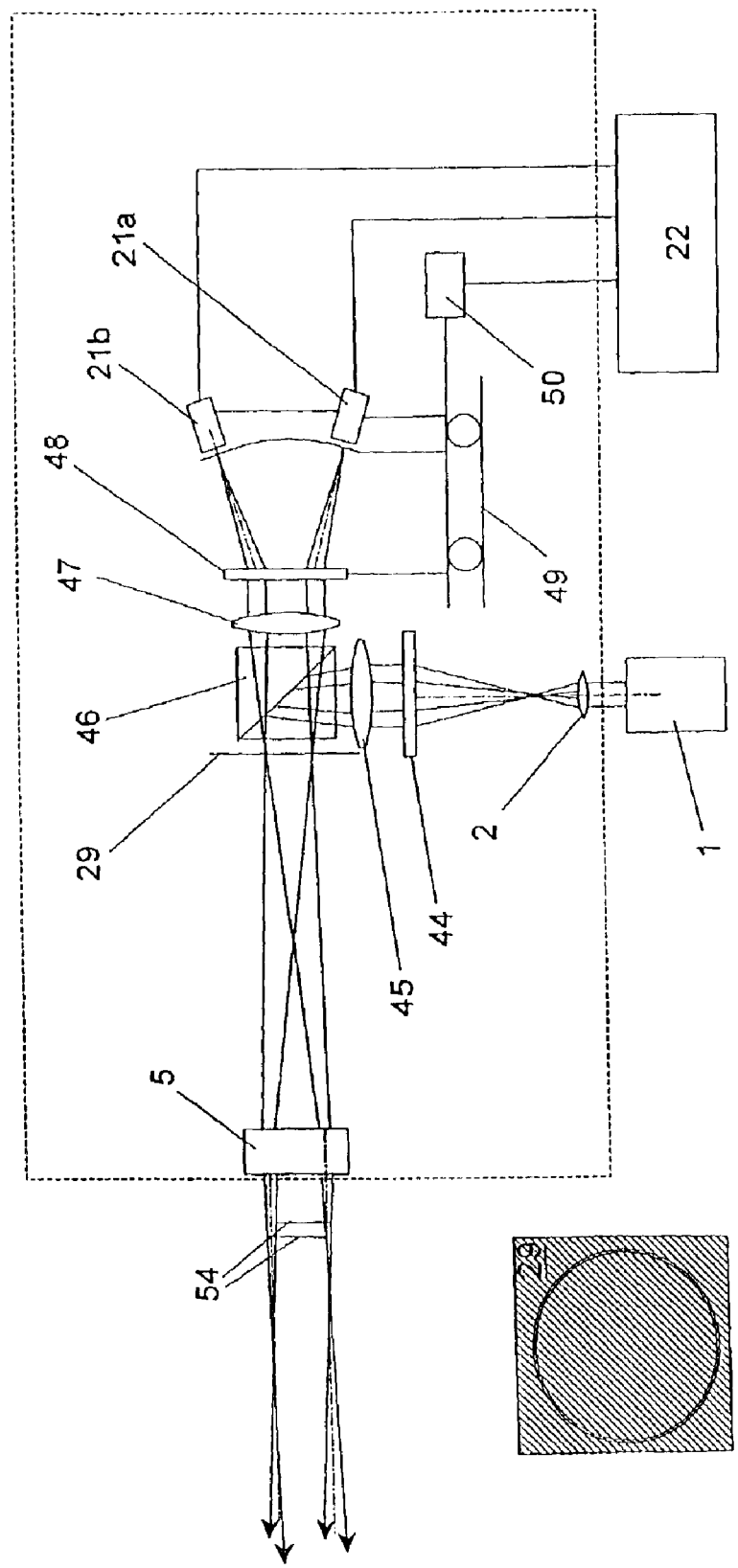
FIG. 11 is a diagrammatic side elevational view of an interferometer mainframe with ring-aperture and detector ring showing a wavefront plane wavefront leaving it.

In FIG. 11, a modular embodiment of the concept is shown. To allow for different configurations, it is useful to build an instrument which can act very similar to the mainframe of a conventional Fizeau-interferometers housing detectors, the beam-splitter and the ring-aperture, as well as means for focusing. The optical interface to further optics is by a cone of plane waves 54, which are produced by a collimating lens 5 with the ring-shaped aperture in its focus. The light source 1 and computer 22 and electronics might be outside of the housing of this main-frame for thermal reasons.

In the following FIGS. 12 through 23 different configurations which might be placed in front of the mainframe of FIG. 11 are shown. These configurations deliver solutions for measurement tasks as:

Testing (i.e., finding the wavefront-errors to be used as a correction-matrix in the final application of the null-lens) the refractive null lens or the diffractive CGH;

Testing the aspherical surface;

Calibrating the test-set-up with the help of an aspherical surface, which is known a priori. This possibility is described later in greater detail;

Qualifying a refractive null-lens, as it is described in and needed for the task described in U.S. Provisional Patent Application No. 60/299,512 filed in the name of Carl A. Zanoni on Jun. 20, 2001 for METHOD FOR MEASURING ASPHERICAL OPTICAL SURFACES and later converted in U.S. patent application Ser. No. 10/152,075 filed in the name of Carl A. Zanoni on May 21, 2002 for APPARATUS AND METHOD FOR MEASURING ASPHERICAL OPTICAL SURFACES AND WAVEFRONTS; and Testing lenses in transmission in different configurations.

Figure 12:
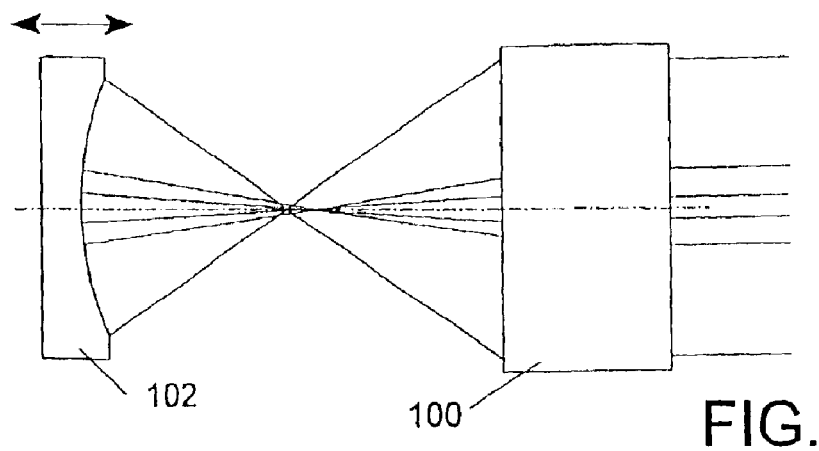
FIG. 12 is a diagrammatic side elevational view showing testing of the refractive null lens or diffractive CGH.

FIG. 12 shows an arrangement employing a converging refractive null lens or diffractive CGH 100 and a converging spherical mirror 102 for testing the refractive null lens or CGH.

Figure 13:
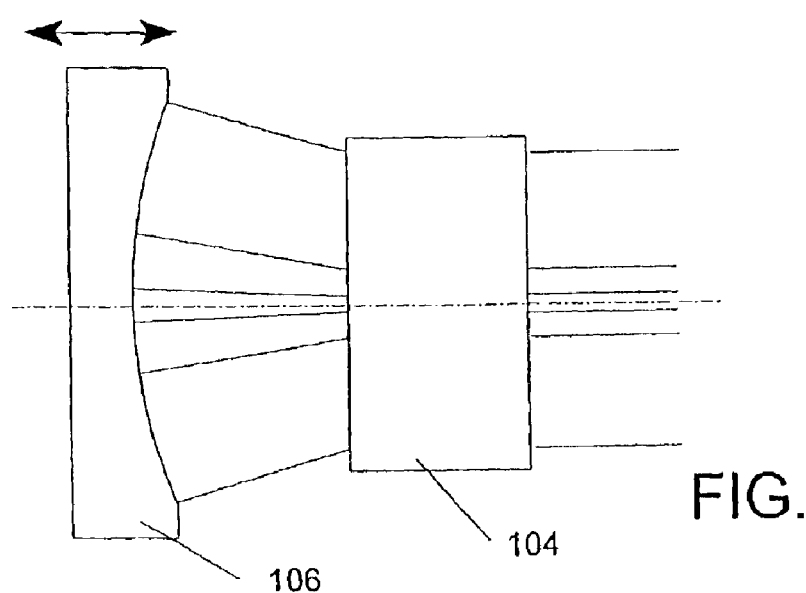
FIG. 13 is a diagrammatic side elevational view showing testing of the refractive null lens or diffractive CGH.

FIG. 13 shows an arrangement employing a diverging refractive null lens or diffractive CGH 104 and a converging spherical mirror 106 for testing the null lens or CGH.

Figure 14:
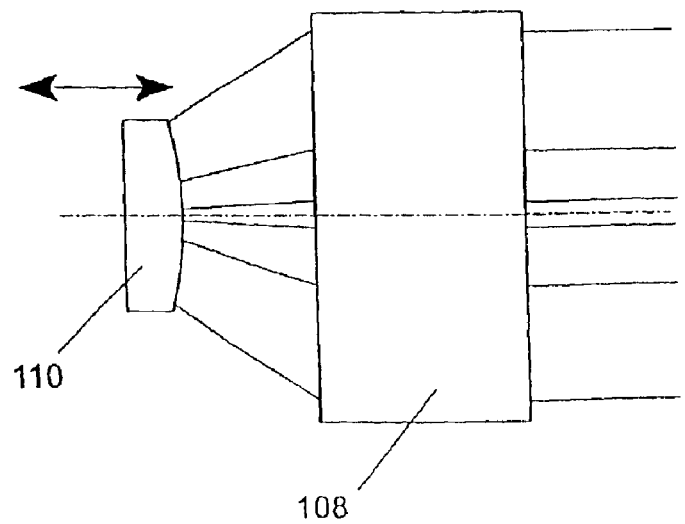
FIG. 14 is a diagrammatic side elevational view showing testing of the refractive null lens or diffractive CGH.

FIG. 14 shows an arrangement employing a converging refractive null lens or diffractive CGH 108 and a diverging spherical mirror 110 for testing the null lens or CGH.

Figure 15:
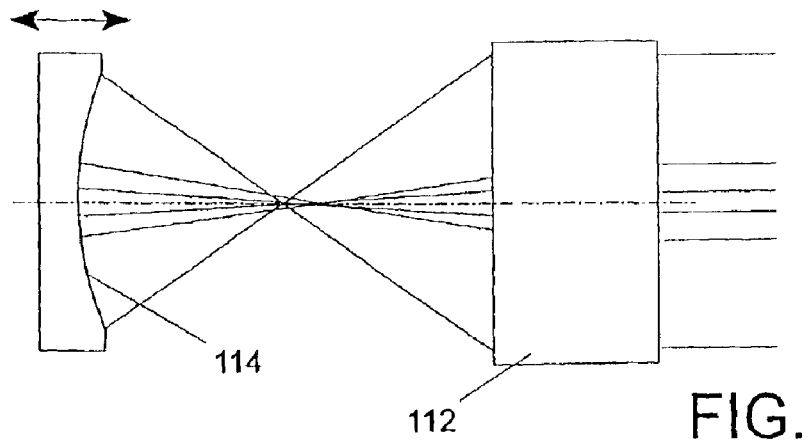
FIG. 15 is a diagrammatic side elevational view showing testing of the aspherical surface or calibrating the set-up.

FIG. 15 shows an arrangement employing a decollimator 112 and an unknown aspherical surface or known asphere 114 for testing the unknown aspherical surface or calibrating the set up.

Figure 16:
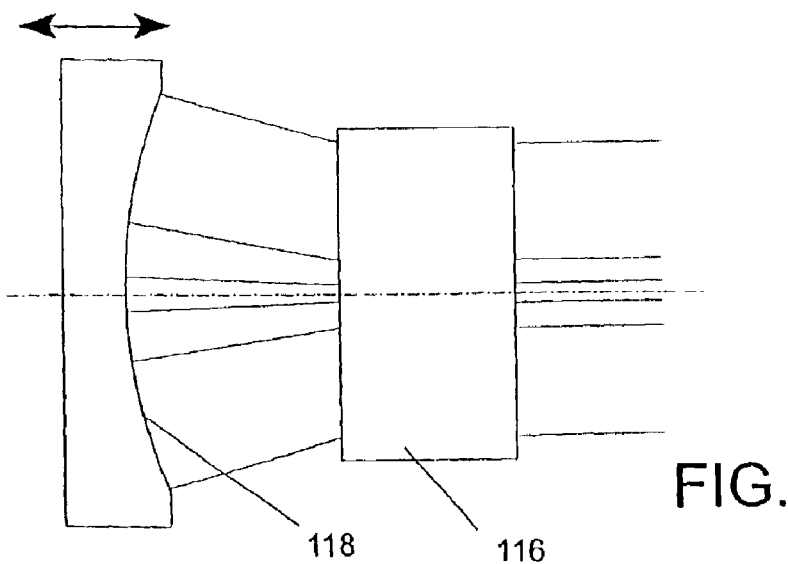
FIG. 16 is a diagrammatic side elevational view showing testing of the aspherical surface or calibrating the set-up

FIG. 16. shows an arrangement employing a diverger lens 116 and an unknown converging aspherical surface or known asphere 118 for testing the unknown aspherical surface or calibrating the set-up.

Figure 17:
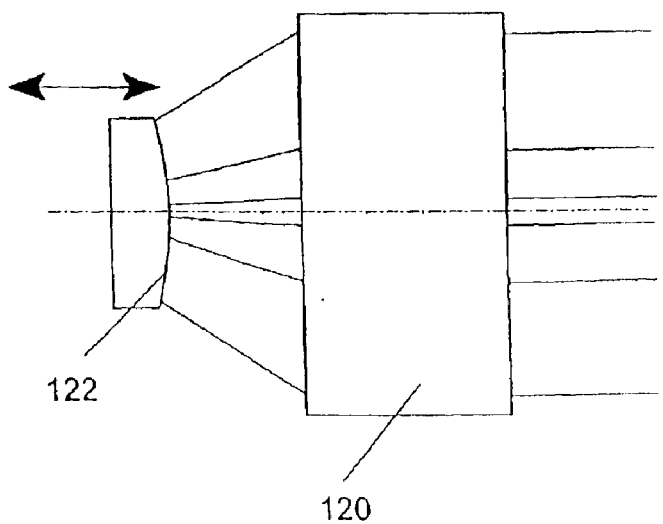
FIG. 17 is a diagrammatic side elevational view showing testing of another aspherical surface or calibrating the set-up

FIG. 17 shows an arrangement employing a decollimator 120 and an unknown aspherical surface or known asphere 122 for testing the unknown aspherical surface or known asphere for calibration of the set-up.

Figure 18:
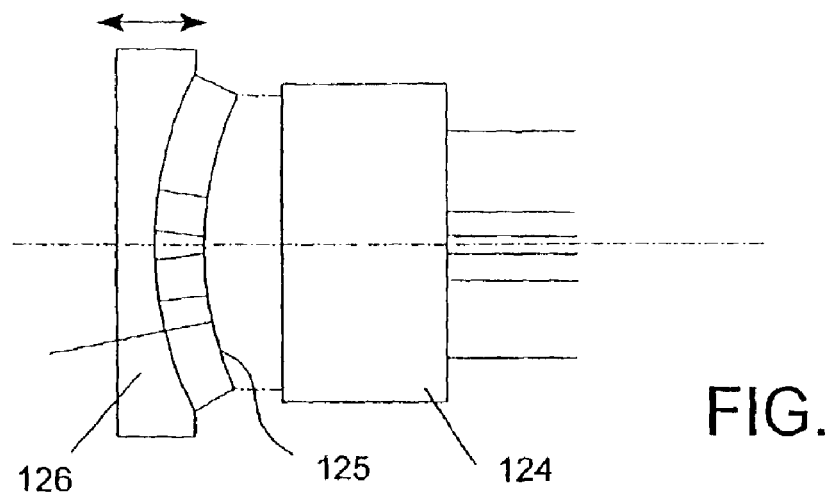
FIG. 18 is a diagrammatic side elevational view showing the qualification of a reflective null lens.

FIG. 18 shows an arrangement in which a reflective null lens 124, a spherical mirror 126 and an aspherical reference surface 125 are used to qualify the reflective null lens 124.

Figure 19:
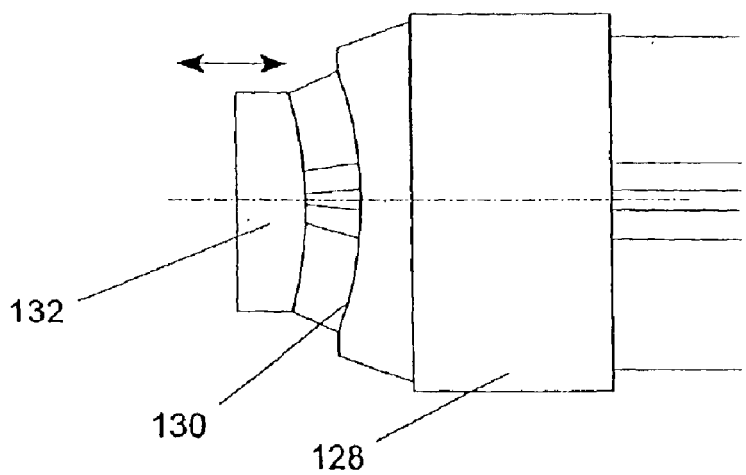
FIG. 19 is a diagrammatic side elevational view showing the qualification of another a reflective null lens

FIG. 19 shows an arrangement in which a reflective null lens 128, an aspherical reference surface 130 and a spherical mirror 132 are used to qualify the reflective null lens 128.

Figure 20:
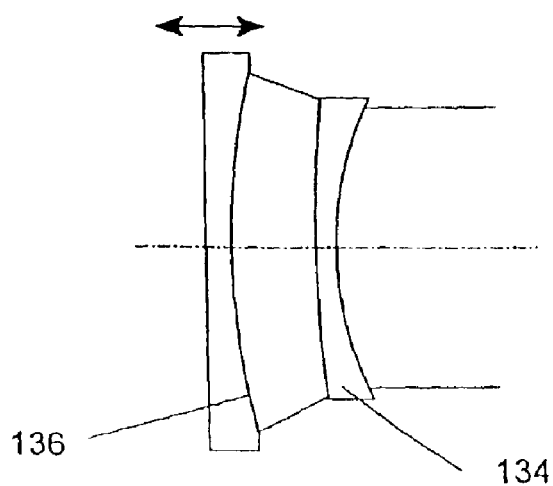
FIG. 20 is a diagrammatic side elevational view illustrating measurement of the aspherical wavefront of a lens in transmission with one conjugate at infinity.

FIG. 20 shows an arrangement in which a lens 134 with negative power in transmission and a spherical mirror 136 may be used to measure the aspherical wavefront of the lens in transmission with one conjugate at infinity.

Figure 21:
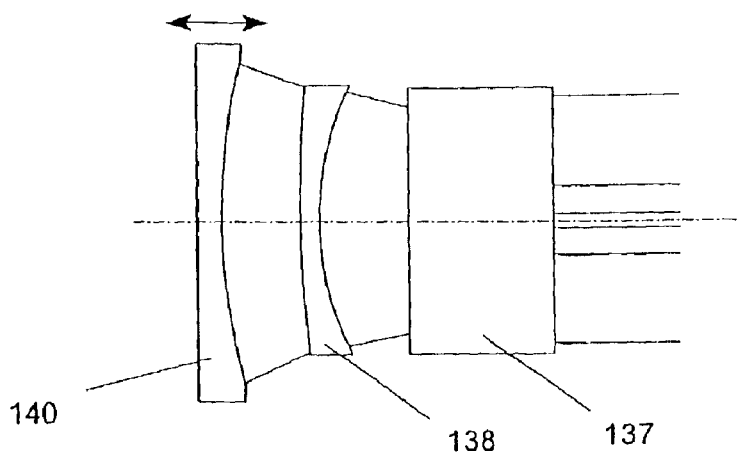
FIG. 21 is a diagrammatic side elevational view showing the measurement of an aspherical wavefront of a lens in transmission with conjugates optimized for minimal aspherical departure.

FIG. 21 shows an arrangement in which a diverger 137, a lens 138 with negative power in transmission, and a spherical mirror 140 are used to measure the aspherical wavefront of the lens in transmission with conjugates optimized for minimal aspherical departure.

Figure 22:
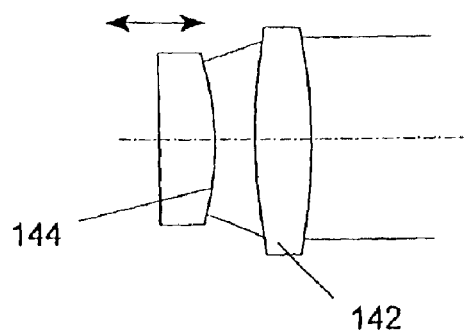
FIG. 22 is a diagrammatic side elevational view showing measurement of the aspherical wavefront of a lens in transmission with one conjugate at infinity.

FIG. 22 is an arrangement in which a lens 142 having positive power in transmission and a spherical mirror may be used to measure the aspherical wavefront of the lens in transmission with one conjugate at infinity.

Figure 23:
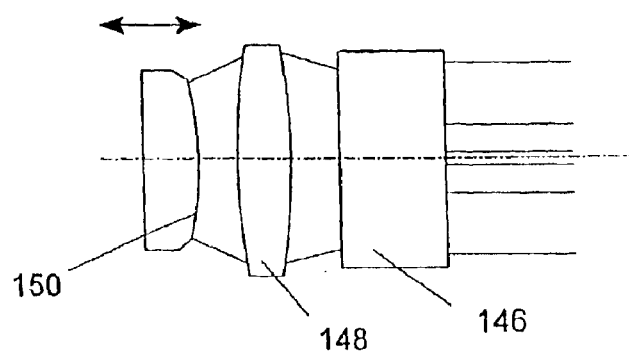
FIG. 23 is a diagrammatic side elevational view illustrating measurement of the aspherical wavefront of a lens in transmission with conjugates optimized for minimal aspherical departure.

FIG. 23 is an arrangement in which a diverger 146, a lens 148 having positive power in transmission, and a spherical mirror 150 can be used to measure the aspherical wavefront of the lens 148 with conjugates optimized for minimal aspherical departures.

In all the foregoing embodiments, it is possible to scan over the surface or wavefront in the radial direction by axially shifting one auto-collimation element. Together with this shift, the heterodyne frequency for the phase-measurement is delivered automatically. In all cases, the coherence length of the light-source can be as small as the aspherical departure, and there is no need to adjust optical path length for the beams to make them interfere. Also, due to the nearly common path principle, sensitivity against vibrations is reduced considerably, which is important for the realization of predictable monotonic and smooth phase-function in time. Also, the sensitivity to air-turbulence within the measuring volume is reduced because only air-gradients within this volume are harmful whereas, in the case of a Twyman-Green set up, the differences in both arms are harmful, and these are much bigger because of the smaller correlation of the air in both arms. Also, as is shown in FIGS. 12 to 23, it is demonstrated that sensible ways for solving the measurement problems with a minimal air path always exist.

Three possibilities for calibrating test set-ups are shown in FIGS. 15, 16 and 17. In these, the underlying concept is to scan a known aspherical surface in front of the de-collimator or diverging lens and to use this now known aspherical surface afterwards to assist in the measurement of an unknown aspherical surface. This way, the measurement is based ultimately on the surface of an a priori known asphere. The measurement procedure and the algorithm described with Eqs. (3) and (4) are only intermediate steps because the surfaces can not be optically compared to each other in a direct manner. The scanning-procedure acts as a "transformer" between the surfaces.

Therefore, the final accuracy of the measurements is based on the quality with which a special aspherical surface, like a parabola, can be performed. It should be mentioned that the measurement of a parabola can be related to the measurement of a plane and a sphere, and both can be performed absolutely. Another candidate for calibration purposes is a hyperbola, which can be tested with the help of two spheres. Also, a lens in transmission together with a sphere for auto-collimation can be used. In addition, lenses exist which deliver a stigmatic wavefront in a special configuration (and can be tested with solely spherical wavefronts) and deliver a strong aspherical wavefront in different configuration, which can be used for calibration.

Figure 24:
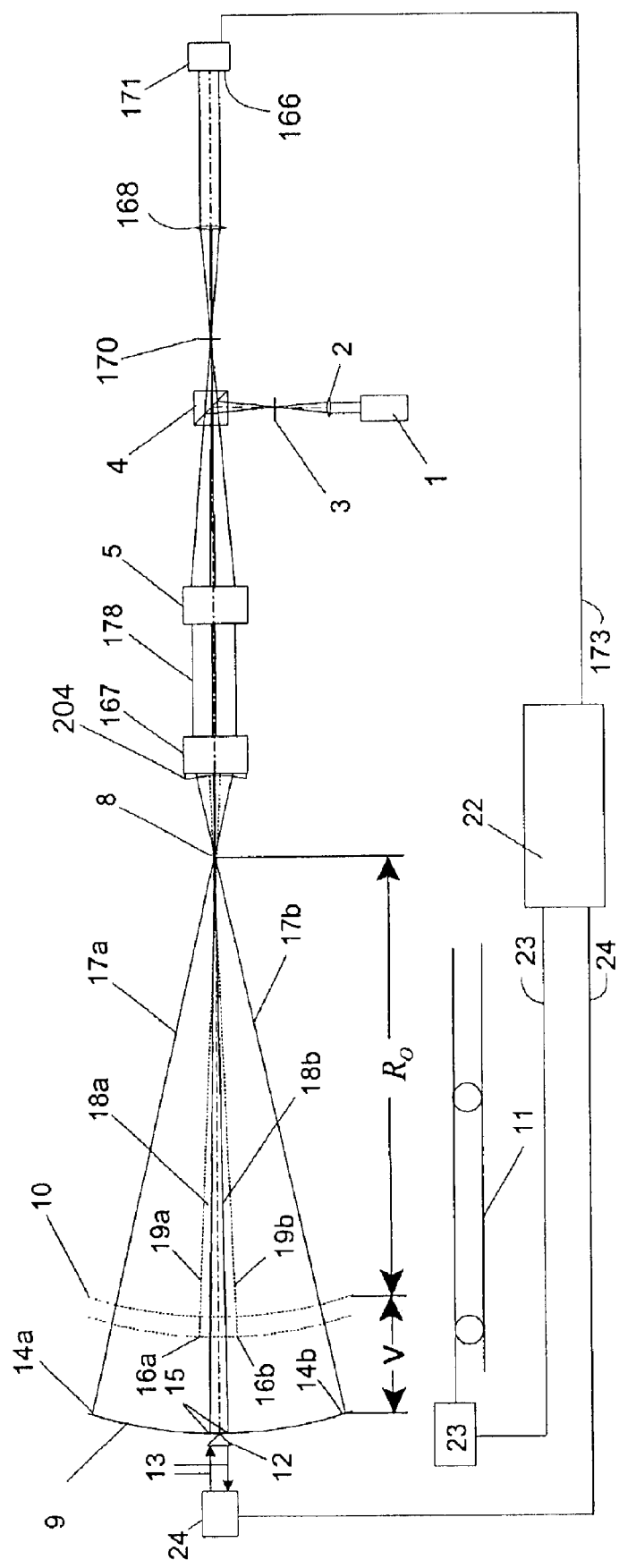
FIG. 24 is a diagrammatic side elevational view illustrating an embodiment of the invention that employs a spherical reference surface and associated imaging optics to enable the measurement of spherical, mildly aspheric, and mildly aspheric surfaces with multiple zones.
Figure 25:
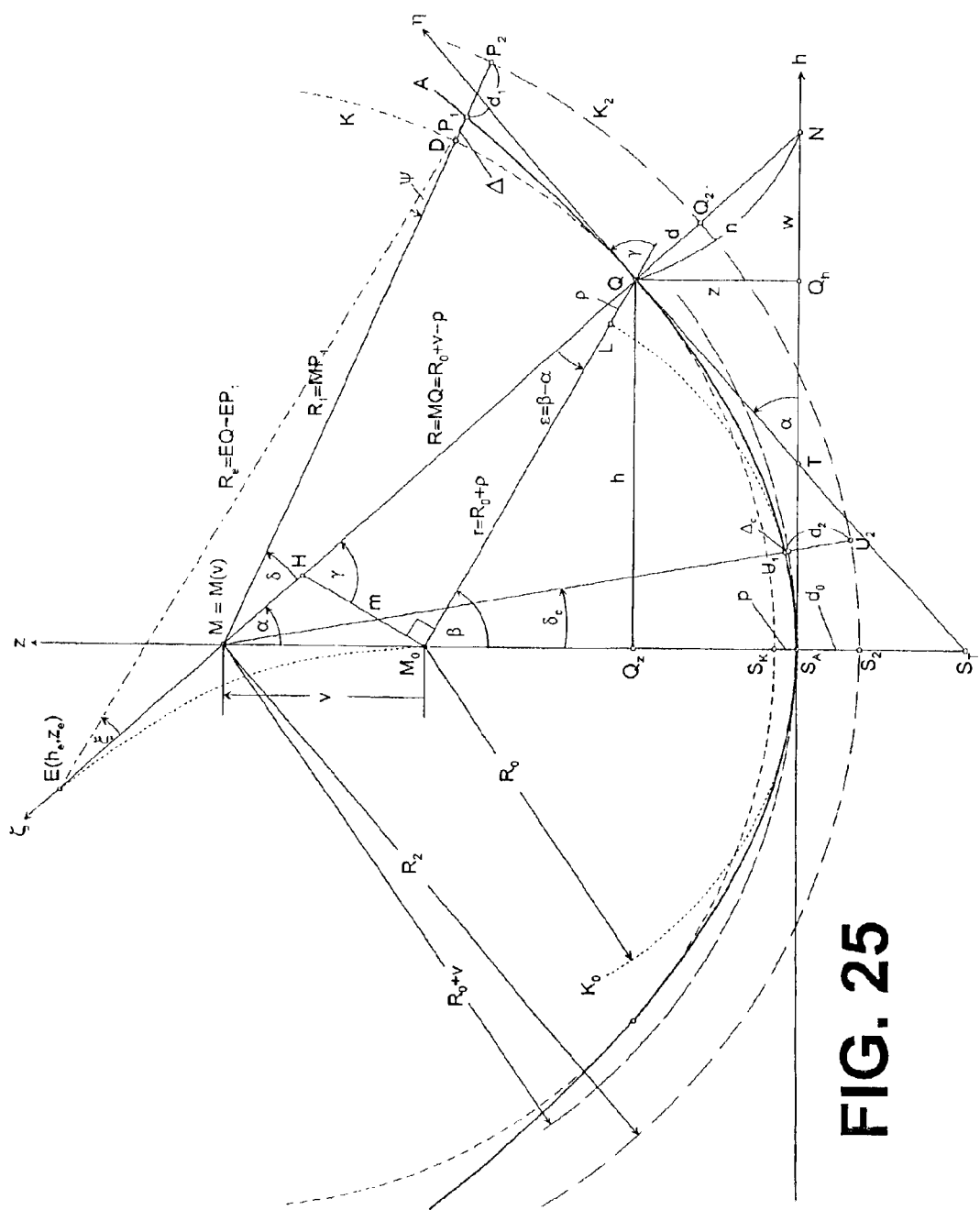
FIG. 25 is a drawing illustrating various parameters and their relationships used in the embodiment of FIG. 24.

Reference is now made to FIGS. 24 and 25 where FIG. 24 shows a diagrammatic side elevational view illustrating an embodiment of the invention that employs a spherical reference surface and associated imaging optics to enable the measurement of spherical, mildly aspheric, and mildly aspheric surfaces with multiple zones. FIG. 25 illustrates various parameters and their relationships used in the embodiment of FIG. 24.

As best seen in FIG. 24, this embodiment has many parts in common with the embodiment of FIG. 1, and the parts in common with those of FIG. 1 continue to be identified in FIG. 24 with the same reference numerals as were used to identify them in FIG. 1. This embodiment, however, differs in significant structural and operational ways from that of FIG. 1. The principal structural differences include the use of a spherical reference surface 204 as the last surface of the de-collimator 167 (transmission sphere), the use of a normal sized aperture 170 (about 2 mm); and the use of a two-dimensional CCD camera 171, or the like, that provides signals 171 containing phase information to computer 22. The spherical reference surface acts as part of a Fizeau cavity, which is unlike the embodiments of before. However, as before, an image 8 of pinhole 3 is formed forward of spherical reference surface 204. The aspherical surface under test is again designated at 9 and may be mildly aspheric, mildly multiply aspheric, or even spherical. What constitutes a mildly aspheric surface is governed by the ability of the detector to resolve resultant fringes with sufficient spatial resolution for meaningful results, and may, for example, be on the order of 20 micrometers departure from a sphere.

An intermediate image of the surface under test occupies the intervening space 178 located between collimating lens 5 and de-collimating lens 167, and a final image of the surface under test is formed on CCD-camera 171 via aperture 170 and following lens 168. On CCD-camera 171 the final image is designated at 166.

As before, a surface under test 9 is moved relative to image point 8 from which a diverging spherical wavefront of known geometry emanates. The expanding spherical wavefront contacts the surface under test at one or more zones and as a result interferograms are formed at 166 on CCD camera 171 with resultant signals 173 passed to computer 22 as the distance between the surface under test and point 8 is made to vary. In this connection, the CCD-camera 171 is shifted axially during the scan of the aspherical surface to maintain optimal imaging conditions of aspherical surface 9 onto the CCD-chip. Note that the tolerances for this focussing are not stringent because only rays with normal incidence onto the aspherical surface are used for the measurement, a distinct advantage compared with other methods.

Having described the major structural differences with this embodiment, its principal and method of operation will now be described.

When mild aspherical surfaces are illuminated with a spherical wavefront in a Fizeau cavity, provided as here with a spherical reference surface, relatively broad zones in the interferogram show up, where the fringe density is low enough to be resolved and measured with a CCD-camera 171 with a sufficiently high number of pixels. Phase measurements of the interferogram can be done in a quite conventional way by phase-shifting with the help of tuning the wavelength of the diode-laser source 1. Because the asphere is mild and the zones are broad, the axial scan can be done with a lower number of axial steps that may be on the order of 500 to 1000 compared to about 100,000 for the previous approaches where the beams from the two zones on the asphere are made to interfere with each other.

It will be appreciated that, when the interferograms thus formed are analyzed, the phase in the center of the surface and also in the zone, where the rays are nearly perpendicular, the departure from the fitting sphere is either concave or convex as illustrated in FIG. 25, i.e., there is an inflection point.

Referrring now to FIG. 25, the derivation for h and z will be developed so that these quantities can be calculated given the availability of the measured values of v and p from the geometry and parametric relationships of the Fizeau arrangement of FIG. 24. From FIG. 25, it can be appreciated that the aspheric test surface can be represented by:

$$z(h) = \left( \frac{c}{1 + \sqrt{1 - (1+k)c^2 h^2}} + a_2 \right) h^2 + a_4 h^4 + \ldots + a_n h^n \quad (6a)$$

$$c = \frac{1}{R_0} \quad (6b)$$

with $$R_0 = \frac{\sqrt{(1 + (z'(0))^2)^3}}{z''(0)} \quad (6c)$$

Radius of the apex-sphere $$z'(h) = \frac{(1+k)c^3 h^3}{\left(1 + \sqrt{1-(1+k)c^2 h^2}\right)^2 \sqrt{1-(1+k)c^2 h^2}} + \frac{2c \cdot h}{1 + \sqrt{1-(1+k)c^2 h^2}} + 2a_2 h + 4a_4 h^3 + \ldots + n \cdot a_n h^{n-1} \quad (6d)$$

From FIG. 25, the following 3 equations may also be derived:

$$z' = \frac{dz}{dh} = \tan\alpha = \frac{h}{R_0 + v - z} \quad (7a)$$

$$\cos\alpha = \frac{(R_0 + v - z)}{(R_0 + v - p)} \quad (7b)$$

$$\sin\alpha = \frac{h}{(R_0 + v - p)} \quad (7c)$$

From (9b) and (9c):

$$(R_0+v-p)^2 = h^2 + (R_0+v-z)^2 \quad (7d)$$

Solving the two equations (7a) and (7d) for v and p, it follows that:

$$v = z - R_0 + \frac{h}{z'} \quad (8a)$$

$$p = z + \frac{1 - \sqrt{1 + z'^2}}{z'} \cdot h \quad (8b)$$

When the center point M(v) of the circle K is shifted an infinitesimal distance dv, the radius of the circle grows by another infinitesimal quantity dp and the new circle cuts the old circle in the common point Q(h,z) because A can be seen as the envelope of all circles K. The equation for the new circle is:

$$(R_0+v+dv-p-dp)^2 = h^2 + (R_0+v+dv-z)^2 \quad (7e)$$

To compute the coordinates h and z, Eqs. (7d) and (7e) have to be solved for these quantities.
For z we get:

$$z = p + (R_0 + v - p)\frac{dp}{dv} + \left(1 - \frac{1}{2}\frac{dp}{dv}\right)dp$$

The last term can be neglected because it goes to zero for dp→0. So we get finally for z with $$p' = \frac{dp}{dv} = \frac{d}{dv}p(v):$$

$$z = p + (R_0+v-p) \cdot p' \quad (9a)$$

For h we get:

$$h = (R_0+v-p)\sqrt{p'(2-p')} \quad (9b)$$

In the 4 equations (8a), (8b) and (9a), (9b), $R_0$ is a constant and relations between the following 6 variables are given: h, z, z', v, p, p'

We may solve that system of equations for 4 of the variables. As meaningful new relations we get:

$$p' = 1 - \frac{1}{\sqrt{1 - z'^2}} \quad (10a)$$

or:

$$z' = \frac{\sqrt{p'(2-p')}}{1-p'} \quad (10b)$$

With (7a) it follows from (10a):

$$' = 1 - \cos\alpha \quad (10c)$$

or $$\cos\alpha = 1 - p' \quad (10d)$$

$$\sin\alpha = \sqrt{p'(2-p')} \quad (10e)$$

We can interpret (9a) and (9b) such, that z and h are given as functions of the parameters v and p, whereas p is again a function of v for a given, specific aspherical curve A. Therefore, if we rewrite (9a) and (9b) more rigorously, they are now:

$$z(v, p(v)) = p(v) + (R_0+v-p(v)) \cdot p'(v) \quad (9a')$$

$$h(v, p(v)) = (R_0+v-p(v))\sqrt{p'(v)(2-p'(v))} \quad (9a')$$

If we want to compute the derivative of z with respect to h, we can now take the intermediate step to compute the derivative of both z and h with respect to v and then compute z' as the quotient of the two derivatives, which again leads to Eq. (10b):

$$\frac{dz(v, p(v))}{dv} = p'(2 - p') = p''(R_0 + v - p) \tag{10f}$$

$$\frac{dh(v, p(v))}{dv} = (1 - p')\left(1 + \frac{(R_0 + v - p)p''}{\sqrt{p'(2 - p')}}\right) \tag{10g}$$

$$\frac{dz}{dh} = \frac{\frac{dz}{dv}}{\frac{dh}{dv}} = z'(v, p(v)) = \frac{\sqrt{p'(v)(2 - p' - (v))}}{1 - p'(v)} \tag{10b'}$$

In a similar manner, we can compute the second derivative, z", for later use:

$$\frac{d^2z}{dh^2} = z''(v, p(v)) = \frac{\frac{dz'(v, p(v))}{dv}}{\frac{dh(v, p(v))}{dv}} = \tag{10h'}$$

$$\frac{p''(v)}{(1 - p'(v))^3(2p'(v) - (p'(v))^2 + (R_0 + v - p(v)) \cdot p''(v))}$$

Writing (10h') in a shorter manner without the arguments:

$$z'' = \frac{p''}{(1 - p')^3(2p' - p'^2 + (R_0 + v - p)p'')} \tag{10h}$$

The third derivative z''' can be derived in the same manner:

$$z''' = \frac{\sqrt{p'(2 - p')}(2p''' p' - 3p''' p'^2 + p''' p'^3 + 12p''^2 p' - 6p''^2 p'^2 + 3p''^3(R_0 + v - p) - 3p''^2)}{(1 - p')^5(2p' - p'^2 + (R_0 + v - p)p'')^3} \tag{10i}$$

With (10f), (10b), (8a) and (8b), the inverse function p" can be computed. It is:

$$p'' = \frac{z'' z'^3}{\sqrt{1 + z'^2}(1 + z'^2)(z'(1 + z'^2) - hz'')} \tag{10j}$$

For p''', we get from (10g) together with (10h):

$$p''' = \frac{z'^4(z'''z'^6 - 3z''z'^5 + 2z'''z'^4 + z'''z'^2 + 3z''^2z' - 3z''^3h)\sqrt{1 + z'^2}}{D} \tag{10k}$$

$$D = z'^{15} + 6z'^{13} - 3z''z'^{12}h + 15z'^{11} - 15z''z'^{10}h + \\ (20 + 3z''^2h^2)z'^9 - 30z''hz'^8 + (12z''^2h^2 + 15)z'^7 - \\ (30z''h + z''^3h^3)z'^6 + (18z''^2h^2 + 6)z'^5 - (15z''h + 3z''^3h^3)z'^4 + \\ (12z''^2h^2 + 1)z'^3 - (3z''h + 3z''^3h^3)z'^2 + 3z''^2h^2z' - z''^3h^3$$

The coordinate points of the evolute of the asphere must now be calculated. $R_e$ is the radius of the best fitting sphere at point Q of the asphere; the center point of this sphere is located in $E(h_e, z_e)$ with the coordinates:

$$h_e = h - \frac{z'}{z''}(1 + z'^2) \tag{11a}$$

$$z_e = z + \frac{1}{z''}(1 + z'^2) \tag{11b}$$

The distance from E to Q (i.e., the radius of the best fitting sphere in Q) is $R_e$:

$$R_e = \frac{\sqrt{(1 + z'^2)^3}}{z''} \tag{11c}$$

The infinitesimal small element ds along the surface (line-element) is given by:

$$ds = R_e \cdot d\xi \tag{11d}$$

The equations (11a) to (11c) can also be expressed in the v, p variables:

$$h_e = -\frac{\sqrt{(p'(2 - p'))^3}}{p''} \tag{11e}$$

$$z_e = \frac{(2 - 3p' + p'^2)p'}{p''} + R_0 + v \tag{11f}$$

$$R_e = \frac{(2 - p')p'}{p''} + (R_0 + v - p) \tag{11g}$$

Now for the Fizeau type arrangement of FIG. 24, the optical path difference in the center-region, as well as in the zone where the aspherical curve has the same tangent as a sphere concentric to the reference spherical surface, is calculated.

In FIG. 25, the aspherical surface A is illuminated such that all rays transmit it's surface first in normal direction and then strike the spherical reference surface $K_2$. The rays are reflected at the aspherical surface as well as at the spherical surface. Only those parts on the resulting interferogram are of interest where the rays reflected on the spherical surface return to the instrument in nearly the same direction, i.e., are reflected in "autocollimation". These are the rays that return "near" the center point M of the circle $K_2$.

The fringes of the interferogram are due to the optical path difference OPD between the asphere A and the sphere $K_2$. This OPD is computed at three different distinct locations (see FIG. 25):

at the vertex $S_A$ of the asphere:

$$\rightarrow OPD_{S_A S_2} = 2d_0 = 2 \cdot (R_2 - R_0 - v) \tag{12a}$$

at a point $U_1$ near the vertex of the asphere:

$$\rightarrow OPD_{U_1 U_2} = 2d_2 = 2 \cdot (R_2 - R_0 - v + \Delta_c) \tag{12b}$$

in the point Q of the asphere:

$$\rightarrow OPD_{\overline{QQ_2}} = 2d = 2 \cdot (R_2 - R) = 2 \cdot (R_2 - R_0 - v + p) \tag{12c}$$

in the point P1 of the asphere:

$$\rightarrow OPD_{\hat{P}_1 P_2} = 2d_1 = 2 \cdot (R_2 - R - \Delta) = 2 \cdot (R_{2-R0} - v + p - \Delta) \tag{12d}$$

Whereas, at the first two locations, the rays are normal to the asphere as well as to the sphere and therefore pass exactly through the center-point M of the sphere, the rays reflected at $P_1$ strike the asphere under an angle which deviates from normal by $\psi$, i.e., when returning, the rays from $P_1$ and $P_2$ form an angle of $2\psi$. The fringe spacing g at this location expressed in coordinates of the part is therefore (this is an approximation):

$$g(v, \delta) = \frac{\lambda}{2\sin(\psi(v, \delta))} \quad (12e)$$

The values of $\psi$ depend on the distance of the point $P_1$ from the point Q; this can be expressed by the angle $\delta$, which therefore serves as an additional parameter in Eq. (12d). The main parameter is $v$ because the location of Q depends on $v$. Calculating the angle $2\psi$ between the reflected rays is one approach to directly conclude the fringe density in the Fizeau-cavity.

The other approach is to look at the change in the OPD of the cavity, when the point $P_1$ departs from Q, i.e., to look at $\Delta$ as a function of $\delta$. The quantity in question for the fringe density is the derivative of $\Delta(\delta)$ with respect to $\delta$ as a function of $\delta$.

Formally, the following function should express quite the same as Eq. (12e):

$$g(v, \delta) = k \cdot 2 \frac{d\Delta(v, \delta)}{ds(v, \delta)} = k \cdot 2 \frac{d\frac{\Delta(v, \delta)}{d\delta}}{d\frac{s(v, \delta)}{d\delta}} = k \cdot 2 \frac{d\frac{\Delta(v, \delta)}{d\delta}}{R_e \cdot d\frac{\xi(v, \delta)}{d\delta}} \quad (12f)$$

with $k = \frac{2\pi}{\lambda}$

Here, ds is the line-element along the aspherical surface as a function of $v$ and $\delta$ and $R_e$ is the radius of the fitting sphere in Q. The line-element on the surface is given by:

$$ds = \sqrt{1 + \left(\frac{dz}{dh}\right)^2} dh \quad (12g)$$

For present purposes, it is more important to know the line element ds as a function of $v$, i.e., ds/dv. With (12a) and (10g) this can be computed as follows:

$$\frac{ds}{dv} = \frac{ds}{dh} \cdot \frac{dh}{dv} = \sqrt{1 + \left(\frac{dz}{dh}\right)^2} \frac{dh}{dv} = \quad (12h)$$

$$\sqrt{1 + \frac{p'(2-p')}{(1-p')^2}} (1-p')\left(1 + \frac{(R_0 + v - p)p''}{\sqrt{p'(2-p')}}\right) =$$

$$1 + \frac{(R_0 + v - p)p''}{\sqrt{p'(2-p')}}$$

We now want to compute $\Delta$ as a function of $\delta$. For that, an approximation is used so the derived equation is only valid in the vicinity of the point Q, i.e., for small values of delta.

We use the $\eta, \zeta$ coordinate system. Since E is the center point of a best fitting circle in Q, this circle is very close to the real aspherical curve A also in the vicinity of Q. So we replace the aspherical curve by this fitting circle.

Coordinates of point D in the $\eta, \zeta$ coordinate system:

$$\eta_D = R \sin \delta \quad (12i)$$

$$\zeta_D = R(1 - \cos \delta) \quad (12j)$$

Equation of a line through M and D (see also FIG. 25):

$$\zeta = R - \frac{\eta}{\tan\delta} \quad (12k)$$

The equation of the fitting circle with center-point E and radius $R_e$ is given by:

$$(\zeta - \zeta_e)^2 + \eta^2 = R_e^2 \quad (12l)$$

The intersection $\eta_1, \zeta_1$ with the best fitting circle is very close to the point $P_1$ on the aspherical curve, especially for small values of $\delta$:

$$\eta_1 = \frac{\tan\delta}{1 + \tan^2\delta}\left(R - R_e + \sqrt{R_e^2 + R(2R_e - R)\tan^2\delta}\right) \quad (12m)$$

$$\zeta_1 = \frac{R\tan^2\delta + R_e - \sqrt{R_e^2 + R(2R_e - R)\tan^2\delta}}{1 + \tan^2\delta} \quad (12n)$$

The approximation for $\Delta$ can now be computed as the distance between the intersection point (this is indistinguishable from $P_1$ in FIG. 25) and D:

$$\Delta = R(1 - \cos\delta) + R_e\cos\delta - \sqrt{(R_e - R)^2\cos^2\delta + R(2R_e - R)} \quad (12o)$$

The angle $\psi$ needed in Eq. (12e) can now also be computed from (12o) by the cosine sentence:

$$\cos\psi = \frac{R_e^2 - (R_e - R)^2 + \left(R + R(1 - \cos\delta) + R_e\cos\delta - \sqrt{(R_e - R)^2\cos^2\delta + R(2R_e - R)}\right)^2}{R\left(R + R(1 - \cos\delta) + R_e\cos\delta - \sqrt{(R_e - R)^2\cos^2\delta + R(2R_e - R)}\right)} \quad (12p)$$

$$g(v, \delta) = \frac{\lambda}{2\sin(\psi(v, \delta))} = \frac{\lambda}{2\sqrt{1 - (\cos(\psi(v, \delta)))^2}} \quad (12q)$$

We now do a series expansion of (12o) in order to show the functional behavior more clearly.

$$\Delta = R(1 - \cos\delta) + R_e\cos\delta - \sqrt{R(2R_e - R)(1 - \cos^2\delta) + R_e^2\cos^2\delta} \quad (12r)$$

$$= R(1 - \cos\delta) + R_e\cos\delta - \sqrt{R(2R_e - R)\sin^2\delta + R_e^2\cos^2\delta}$$

$$= R(1 - \cos\delta) + R_e\cos\delta\left[1 - \sqrt{1 + \frac{R(2R_e - R)}{R_e^2}\tan^2\delta}\right]$$

$$\approx R(1 - \cos\delta) - \frac{R(2R_e - R)}{2R_e}\sin\delta\tan\delta$$

$$= R(1 - \sin\delta\tan\delta - \cos\delta) + \frac{R^2}{2R_e}\sin\delta\tan\delta$$

With $$\sin\delta \approx \delta - \frac{1}{6}\delta^3$$

$$\cos\delta \approx 1 - \frac{1}{2}\delta^2$$

$$\tan\delta \approx \delta + \frac{1}{3}\delta^3$$

With further manipulation:

$$\Delta = \frac{1}{2}R\left(\frac{R}{R_e} - 1\right)\delta^2 + \frac{1}{2}R\left(\frac{1}{6}\frac{R}{R_e} - \frac{5}{12}\right)\delta^4 + \ldots \quad (12s)$$

Due to the approximation, use of the best fitting sphere instead of the real aspherical curve, there is no term in $\Delta$ that is linear with $\delta$. In reality, such a term also exists, but it is very small compared to the quadratic term.

We now insert R and $R_e$ explicitly into (12o) and also into the further approximation (12s):

$$R = R_0 + v - p; \; R_e = \frac{(2-p')p'}{p''} + (R_0 + v - p)$$

$$\Delta = (R_0 + v - p) + \frac{(2-p')p'}{p''}\cos\delta - \quad (12t)$$

$$\sqrt{(R_0+v-p)^2 + \frac{2p'(R_0+v-p)(2-p')}{p''} + \frac{(2-p')^2 p'^2 \cos^2\delta}{p''^2}}$$

$$\Delta = -\frac{1}{2} \cdot \frac{(R_0+v-p)(2-p')p'}{(R_0+v-p)p''+(2-p')p'} \cdot \delta^2 - \quad (12u)$$

$$\frac{1}{24} \cdot \frac{3(R_0+v-p)p''+5(2-p')p'}{(R_0+v-p)p''+(2-p')p'} \cdot \delta^4$$

$\Delta$ is a function of $v$ and $\delta$. When the interferogram is measured with a pixeled camera, adjacent pixels, which measure different intensity values, have different values $\delta$. Since $\delta$ is needed to compute $\Delta$, the question arises, how to deduce values for $\delta$.

In the apex of the aspheric curve, around the point $S_A$, two circles with radii $R_0$ and $R_0+v$ are investigated to compute their deviation when the point under investigation is shifted away from the apex $S_A$. If we again use the term $\delta$ to characterize the angular deviation from the apex, seen from the center point M of the second circle, the formula for $\Delta_C$ (the index c characterizes that we now look at the center) is:

$$\Delta_c = \sqrt{(R_0+v)^2 - v^2\sin^2\delta_c} - (R_0+v\cdot\cos\delta_c) \approx \frac{v \cdot R_0}{2(R_0+v)} \cdot \delta_c^2 \quad (12v)$$

The OPD between the reference spherical surface and the aspherical surface to be measured in the vicinity of the apex is according to Eq. (12b):

$$OPD_{\overline{U_1 U_1}} = 2d_2 = 2\cdot(R_2 - R_0 - v + \Delta_c) \quad (12b)$$

Therefore, the $OPD_{\overline{U_1 U_2}}$ as a function of position (angle $\delta_c$) is:

$$OPD_{\overline{U_1 U_2}}(\delta_c) = 2R_2 - 2R_0 - 2v + \frac{v \cdot R_0}{R_0 + v} \cdot \delta_c^2 \quad (12w)$$

The OPD between the reference spherical surface and the aspherical surface to be measured in the vicinity of the zone, where the surfaces are parallel to each other is according to Eq. (12d):

$$OPD_{\overline{P_1 P_2}} = 2d_1 = 2\cdot(R_2 - R - \Delta) = 2\cdot(R_2 - R_0 - vp - \Delta) \quad (12d)$$

With Eq. (12u) inserted for $\Delta$ we now get:

$$OPD_{\overline{P_1 P_2}}(\delta) = \quad (12x)$$

$$2R_2 - 2R_0 - 2v + 2p + \frac{(R_0+v-p)(2-p')p'}{(R_0+v-p)p''+(2-p')p'} \cdot \delta^2 +$$

$$\frac{1}{12} \cdot \frac{3(R_0+v-p)p''+5(2-p')p'}{(R_0+v-p)p''+(2-p')p'} \cdot \delta^4$$

To recover z and h from the measured OPD values in the vicinity of the apex and the zone, one needs to know p and v as previously indicated.

The OPD at the apex according to (12w) is a function which has a minimum for $\delta_C=0$. So, when the OPD around the apex at several points is measured in a regularly spaced raster and a quadratic function is fitted to the measured values, (this function is described in U.S. Provisional Patent Application No. 60/303,856 filed on Jul. 9, 2001 (now U.S. Pat. No. 10/180,286 filed on Jun. 26, 2002 in the name of Michael Küchel for "SCANNING INTERFEROMETER FOR ASPHERIC SURFACES AND WAVEFRONTS") with Eq. (6)), the minimum of this function delivers the OPD value for $\delta_C=0$, which is $$OPD_{\overline{U_1 U_2}}(\delta_c=0) = 2R_2 - 2R_0 - 2v. \quad (12y)$$

From this equation v is readily derived:

$$v = R_2 - R_0 - \frac{1}{2}OPD_{\overline{U_1 U_2}}(\delta_c = 0) \quad (12z)$$

Note that $R_2$ and $R_0$ are known and fixed quantities (radii of the reference sphere and the "apex sphere" of the aspheric curve), but that the OPD changes when v is changed according to the scanning procedure involved.

To deduce p, a similar approach is used at the zone, where the OPD is described by Eq. (12x). Since v is known from (12z), the principal unknown in (12x) is p. But also, the first and second derivatives of p with respect to v are further unknowns. These unknowns disappear when $\delta$ is set to zero. So the most obvious solution is to measure the OPD in the vicinity of the zone, and to fit a parabola of the form $$OPD_{\overline{P_1 P_2}}(\delta) = \alpha_0 + \alpha_2\delta^2 + \alpha_4\delta^4 \quad (12aa)$$

to the measured OPD values in an equal spaced raster around the zone and then only using the computed value for $\alpha_0$. As can be seen from Eq. (12x), this value for $\alpha_0$ is:

$$\alpha_0 = OPD_{\overline{P_1 P_2}}(\delta=0) = 2R_2 - 2R_0 - 2v + 2p \quad (12ab)$$

From (12y) and (12ab), it can be seen, that p can readily be deduced by subtracting the computed OPD minimum for the apex from the computed OPD minimum from the zone. Thus, the result is:

$$p = \frac{1}{2}\left(OPD_{\overline{P_1 P_2}}(\delta) - OPD_{\overline{U_1 U_2}}(\delta_c = 0)\right) \quad (12ac)$$

Other schemes for computing p are possible too, but are mentioned here only briefly. This includes the measurement of the change of the OPD in the pixels in the vicinity of the zone during the scan procedure, i.e., as a function of v, thus also deducing values for dp/dv and from that also values for $d^2p/dv^2$. Also, $\delta$ can be computed from the imaging scale between the part under test and the interferogram, the latter can be deduced from the known pixel size together with the already computed values for h. Thus, all quantities in (12x) are known preliminary and p can be computed using a least squares fit to all measurable points in the vicinity of the zone. Having the functional relationship p=p(v), the derivatives dp/dv and d²p/dv² can be computed from that and the before computed values can be refined in an iterative manner.

Compared with previous methods and embodiments disclosed herein, where no physical reference surface was used and the rays are directly made to interfere, this method may be relatively slower. Therefore, when steep aspheres are to be measured, where the zones are extremely small and more axial steps would be necessary, the previous methods may be preferred.

Having described the embodiments and operation of the invention, variations will occur to others based on its teachings. Therefore, it is intended that all such variations be within the scope of the invention.

What is claimed is:

1. A scanning method for measuring rotationally and non-rotationally symmetric test optics having aspherical surfaces, said method comprising the steps of:

generating at least a partial spherical wavefront from a known origin along a scanning axis through the use of a spherical reference surface positioned along said scanning axis upstream of said known origin;

aligning a test optic with respect to said scanning axis and selectively moving said test optic along said scanning axis relative to said known origin so that said spherical wavefront intersects the test optic at the apex of the aspherical surface and at one or more radial positions where the spherical wavefront and the aspheric surface intersect at points of common tangency to generate interferograms containing phase information about the differences in optical path length between the center of the test optic and the one or more radial positions;

imaging said interferogram onto a detector to provide an electronic signal carrying said phase information;

interferometrically measuring the axial distance, v, by which said test optic is moved with respect to said origin and calculating the optical path length differences, p, between the center of test optic and the one or more radial positions based on said phase differences contained in said electronic signal, said axial distance v being given by:

$$v = R_2 - R_0 - \frac{1}{2} OPD_{\overline{U}_1 \overline{U}_2}(\delta_c = 0),$$

where $R_2$ is the radius of said spherical reference surface, $R_0$ is the radius of the apex sphere of the aspherical surface, and $OPD_{\overline{U}_1 \overline{U}_2}(\delta_c=0)$ is the optical path difference between the spherical reference surface and the aspherical surface measured in the vicinity of the apex where δ is the angular deviation from the apex to the aspherical surface as seen from said known origin, and p is given by:

$$p = \frac{1}{2}(OPD_{\overline{P}_1 \overline{P}_2}(\delta) - OPD_{\overline{U}_1 \overline{U}_2}(\delta_c = 0)),$$

where $OPD_{\overline{P}_1\overline{P}_2}(\delta)$ is the optical path difference between said spherical reference surface and the aspheric surface at said radial positions;

calculating the coordinates, z and h, of the aspherical surface wherever said circles of curvature have intersected the aspherical surface at common points of tangency and in correspondence with the interferometrically measured distance, v and calculated optical path lengths, p; and determining the shape of said aspheric surface based on said coordinate values and said optical path length differences.

2. The scanning method of claim 1 wherein the radius of the best fitting spheres to the aspherical surface at said radial positions is given by:

$$R_e = \frac{(2-p')p'}{p''} + (R_0 + v - p)$$

with their center locations being given by:

$$h_e = -\frac{\sqrt{(p'(2-p'))^3}}{p''} \text{ and } z_e = \frac{(2-3p'+p'^2)p'}{p''} + R_0 + v.$$

3. The scanning method of claim 1 wherein said phase information contained in said electronic signal is extracted to determine said optical path length differences through the step of phase shifting analysis.

4. The scanning method of claim 3 wherein said step of phase shifting analysis is effected by modulating the wavelength of the source for generating said at least partial spherical wavefront.

5. The scanning method of claim 1 wherein said detector comprises a two-dimensional CCD camera.

6. The scanning method of claim 5 wherein the measurable departure of said aspherical surfaces from said spherical reference sphere vary in accordance with the ability of said CCD camera to resolve resultant fringes with meaningful spatial detail.

7. The scanning method of claim 6 wherein said aspherical surfaces depart from said spherical reference surface by up to on the order of 20 micrometers, more or less.

8. The scanning method of claim 6 wherein said CCD camera is moved axially during a scan of a test aspherical surface to maintain optimal imaging conditions.

9. The scanning method of claim 1 wherein phase distribution of a trace along any azimuthal angle at the apex of the aspherical surface and at the one or more radial positions can, to first order, be approximated by parabolas as given by:

$$\Delta_{centre}(r) = \phi_{centre} + ar^2 \qquad \text{Eq. A}$$

for the apex part of the trace, and like another parabola given by:

$$\Delta_z(r) = \varphi_{centre} + 2p\frac{2\pi}{\lambda} + b(r - r_{int})^2 \qquad \text{Eq. B}$$

for a radial position, where a is a constant, which depends on $R_0$ and v, and b is a constant which depends on the radius of curvature at the point (h, z) of the aspherical surface as well as on $R_0$ and v, a and b normally having different signs; the only quantity to be evaluated being 2p, which is included in the difference of the phases between the center and the zone.

10. The scanning method of claim 9 wherein, to determine the difference in phase, the minimum of $\Delta_{centre}(r)$ and $\Delta_z(r)$ are evaluated and then the difference of both phase values at this minimum are taken.

11. The scanning method of claim 10 further including the step of using the measured phase-values in the neighborhood of the minimum.

12. The scanning method of claim 10 wherein, from the difference in phase from Equations (A) and (B), p is evaluated as a function of the scan-length v, and the values of h and z.

13. The scanning method of claim 12 wherein $$z = p + (R_0 + v - p)\frac{dp}{dv}$$

and $$h = (R_0 + v - p)\sqrt{\frac{dp}{dv}\left(2 - \frac{dp}{dv}\right)}$$

where $R=R_0+v-p$, with $R_0$ equal to the reciprocal apical curvature of the aspherical shape and $$\frac{dp}{dv}$$

is measured.

14. Scanning apparatus for measuring rotationally and non-rotationally symmetric test optics having aspherical surfaces, said apparatus comprising:
  means for generating at least a partial spherical wavefront from a known origin along a scanning axis, said generating means including a spherical reference surface positioned along said scanning axis upstream of said known origin;
  means for aligning a test optic with respect to said scanning axis and selectively moving said test optic along said scanning axis relative to said known origin so that said spherical wavefront intersects the test optic at the apex of the aspherical surface and at one or more radial positions where the spherical wavefront and the aspheric surface intersect at points of common tangency to generate interferograms containing phase information about the differences in optical path length between the center of the test optic and the one or more radial positions;
  a areal detector;
  means for imaging said interferogram onto said areal detector to provide an electronic signal carrying said phase information;
  means for interferometrically measuring the axial distance, v, by which said test optic is moved with respect to said origin and calculating the optical path length differences, p, between the center of test optic and the one or more radial positions based on said phase differences contained in said electronic signal, said axial distance v being given by:

$$v = R_2 - R_0 - \frac{1}{2}OPD_{\overline{U}_1\overline{U}_2}(\delta_c = 0),$$

where $R_2$ is the radius of said spherical reference surface, $R_0$ is the radius of the apex sphere of the aspherical surface, and $OPD_{\overline{U}_1\overline{U}_2}(\delta_c=0)$ is the optical path difference between the spherical reference surface and the aspherical surface measured in the vicinity of the apex where δ is the angular deviation from the apex to the aspherical surface as seen from said known origin, and p is given by:

$$p = \frac{1}{2}\left(OPD_{\overline{P}_1\overline{P}_2}(\delta) - OPD_{\overline{U}_1\overline{U}_2}(\delta_c = 0)\right),$$

where $OPD_{\overline{P}_1\overline{P}_2}(\delta)$ is the optical path difference between said spherical reference surface and the aspherical surface at said radial positions; and
  means for calculating the coordinates, z and h, of the aspherical surface wherever said circles of curvature have intersected the aspherical surface at common points of tangency and in correspondence with the interferometrically measured distance, v and calculated optical path lengths, p; and determining the shape of said aspheric surface based on said coordinate values and said optical path length differences.

15. The scanning apparatus of claim 14 wherein the radius of the best fitting spheres to the aspherical surface at said radial positions is given by:

$$R_e = \frac{(2 - p')p'}{p''} + (R_0 + v - p)$$

with their center locations being given by:

$$h_e = -\frac{\sqrt{(p'(2 - p'))^3}}{p''} \text{ and } z_e = \frac{(2 - 3p' + p'^2)p'}{p''} + R_0 + v.$$

16. The scanning apparatus of claim 14 wherein said means for calculating and determining is structured to extract said phase information contained in said electronic signal to determine said optical path length differences through by phase shifting analysis.

17. The scanning apparatus of claim 16 further including means for modulating the wavelength of the source for generating said at least partial spherical wavefront to effect said phase shifting analysis.

18. The scanning apparatus of claim 14 wherein said areal detector comprises a two-dimensional CCD camera.

19. The scanning apparatus of claim 18 wherein the measurable departure of said aspherical surfaces from said spherical reference sphere vary in accordance with the ability of said CCD camera to resolve resultant fringes with meaningful spatial detail.

20. The scanning apparatus of claim 19 wherein said aspherical surfaces depart from said spherical reference surface by up to on the order of 20 micrometers, more or less.

21. The scanning apparatus of claim 19 further including means for axially moving said CCD camera during a scan of a test aspherical surface to maintain optimal imaging conditions.

22. The scanning apparatus of claim 14 wherein phase distribution of a trace along any azimuthal angle at the apex of the aspherical surface and at the one or more radial positions can, to first order, be approximated by parabolas as given by:

$$\Delta_{centre}(r) = \phi_{centre} + ar^2 \qquad \text{Eq. A}$$

for the apex part of the trace, and like another parabola given by:

$$\Delta_z(r) = \varphi_{centre} + 2p\frac{2\pi}{\lambda} + b(r - r_{int})^2 \qquad \text{Eq. B}$$

for a radial position, where a is a constant, which depends on $R_0$ and v, and b is a constant which depends on the radius of curvature at the point (h, z) of the aspherical surface as well as on $R_0$ and v, a and b normally having different signs; the only quantity to be evaluated being 2ρ, which is included in the difference of the phases between the center and the zone.

23. The scanning apparatus of claim 22 wherein said calculating and determining means determines the difference in phase by evaluating the minimum of $\Delta_{centre}(r)$ and $\Delta_Z(r)$ and then the difference of both phase values at this minimum are taken.

24. The scanning apparatus of claim 23 wherein said calculating and determining means is further is further operative to use the measured phase-values in the neighborhood of the minimum.

25. The scanning apparauts of claim 23 wherein, from the difference in phase from Equations (A) and (B), ρ is evaluated as a function of the scan-length v, and the values of h and z.

26. The scanning apparatus of claim 14 wherein $$z = p + (R_0 + v - p)\frac{dp}{dv}$$

and $$h = (R_0 + v - p)\sqrt{\frac{dp}{dv}\left(2 - \frac{dp}{dv}\right)}$$

where $R = R_0 + v - p$, with $R_0$ equal to the reciprocal apical curvature of the aspherical shape and $$\frac{dp}{dv}$$

is measured.

* * * * *